(12) United States Patent
Hobbs, II et al.

(10) Patent No.: US 7,941,806 B2
(45) Date of Patent: May 10, 2011

(54) METHOD, SYSTEM AND PROGRAM PRODUCT FOR OPTIMIZING COMMUNICATION AND PROCESSING FUNCTIONS BETWEEN DISPARATE APPLICATIONS

(75) Inventors: Alphana B. Hobbs, II, Durham, NC (US); Daniel P. Huskey, Raleigh, NC (US); Shirish S. Javalkar, Cary, NC (US); Tuan A. Pham, Cary, NC (US); William J. Reilly, Cary, NC (US); Allen J. Scribner, III, Fuquay-Varina, NC (US); Deirdre A. Wessel, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1077 days.

(21) Appl. No.: 11/680,661

(22) Filed: Mar. 1, 2007

(65) Prior Publication Data
US 2008/0212602 A1  Sep. 4, 2008

(51) Int. Cl.
*G06F 3/00* (2006.01)
*G06F 15/16* (2006.01)
(52) U.S. Cl. ........................... 719/313; 719/245
(58) Field of Classification Search .................. 719/328, 719/313; 717/100; 709/202, 245
See application file for complete search history.

(56) References Cited

U.S. PATENT DOCUMENTS

| 6,496,878 B1 * | 12/2002 | Azevedo et al. | 710/22 |
| 7,644,169 B2 * | 1/2010 | Cleghorn et al. | 709/230 |
| 2005/0027788 A1 * | 2/2005 | Koopmans et al. | 709/200 |

FOREIGN PATENT DOCUMENTS

JP  2001197125  *  7/2001

OTHER PUBLICATIONS

Erik Guttman, Service Loaction Protocal: Automatic Discovery of IP Network Service, Aug. 1999.*

* cited by examiner

*Primary Examiner* — Lechi Truong
(74) *Attorney, Agent, or Firm* — John R. Pivnichny; Law Office of Jim Boice

(57) ABSTRACT

A method of optimizing communication and processing functions between disparate applications includes sending, from a first application to a disparate second application, a request message. The request message, which has a reduced data size for optimizing communication, is formatted in a first request-format to provide unique data elements relevant to processing the request message. The received request message is reformatted into a second request format, and is then forwarded to a third application. The third application creates a response message that is in a first response format, and sends the response message to the second application. Each received response message is queued, by a messaging application, into a response message collection corresponding to a message type, before sending the response group to the first application.

18 Claims, 13 Drawing Sheets

METHOD, SYSTEM AND PROGRAM PRODUCT FOR OPTIMIZING COMMUNICATION AND PROCESSING FUNCTIONS BETWEEN DISPARATE APPLICATIONS

FIELD OF THE INVENTION

The present invention relates to a method, system and program product for optimizing communication between disparate applications. More particularly, the present invention relates to a method, system and program product for eliminating redundant data and grouping the data to optimize the transmission and load process between disparate applications.

BACKGROUND OF THE INVENTION

Businesses are constantly evolving and as a business continues to grow, an existing interface between different systems can tend to experience performance and capacity issues, especially upon the addition of a new business that is to be supported by the existing interface. Given that not every application within the interface can accommodate changes that enhance performance and/or improve capacity, it becomes critical to resolve such issues without causing any disruptions in the business. As such, there is a need for a business to provide a cost-effective way to enhance performance without impacting those applications unable to accommodate the necessary changes.

SUMMARY OF THE INVENTION

In a first aspect of the invention, there is provided a method of optimizing communication and processing functions between disparate applications. The method includes sending, from a first application to a second application, a request message of one or more request messages, the request message being formatted in a first request-format to provide a plurality of unique data elements relevant to processing the request message and having a reduced data size for optimizing communication. Further, the method includes reformatting, by the second application, the request message received having the first request-format into a reformatted request message having a second request-format, the reformatted request message being forwarded to a third application and creating, by the third application, a response message having a first response-format, the response message being sent to the second application. Furthermore, the method includes queuing, by a messaging application, each response message received from the second application into a response message collection corresponding to a message type, before sending the response message collection to the first application, such that, processing of the response message collection received by the first application is optimized. The method further includes converting by the second application the response message received in the first response-format from the third application into a reformatted response message having a second response-format and sending the reformatted response message having the second response-format to the first application. Further, in an embodiment, the queuing step further includes determining, by the messaging application, a message type of one or more message types for the reformatted response message received from the second application, parsing data received in the reformatted response message received, loading the data parsed into an appropriate holding table in the messaging application and grouping the reformatted response message in the collection of a plurality of collections of reformatted response messages based on the message type determined for the reformatted response message. In an embodiment, the grouping step further includes collecting, by the messaging application, each reformatted response message received into an appropriate collection of the plurality of collections of reformatted response messages based on the message type determined, until a predetermined collection criterion has been met. Further, the collecting step includes assigning a timestamp to each of the plurality of collections of reformatted response messages for group processing by the first application. In an embodiment, the method further includes calling a function module in the first application to receive the data loaded in the appropriate holding table in the messaging application and to load the data received into a custom table of a plurality of custom tables in the first application, the custom table corresponding to the message type and triggering processing of the data received and loaded into the first application. In an embodiment, the triggering processing step further includes grouping data, in the first application, based on processing criteria, discarding data determined to be duplicate data from the data grouped and processing, based on the message type, the data grouped and discarded, such that, the processing of the data grouped and discarded is carried out either in real time mode or in batch mode, depending on the message type. In an embodiment, the first application is a fulfillment application, the second application is a routing application and the third application is a scheduling-shipment application. In an embodiment, the message type includes at least one of an initial scheduling message, a rescheduling message or a shipment message.

In another aspect of the invention, there is provided a system for enhancing communication and processing functions between disparate applications. The system includes a first application configured to send a communication request having a condensed format, the condensed format of the communication request having a data structure that provides a new segment containing a plurality of unique data elements relevant to processing the communication request, the data structure having a reduced data size for enhancing communication. Further, the system includes a second application configured to convert the communication request received having the condensed format into a reformatted communication request having an expanded format. In addition, the system includes a third application configured to receive the reformatted communication request having the expanded format from the second application and to generate and send to the second application a communication response having a first response-format, the second application being configured to convert the communication response received having the first response-format into a reformatted communication response having a second response-format before forwarding the reformatted communication response. Moreover, the system includes a messaging application configured to queue each reformatted communication response having the second response-format forwarded by the second application into a response group corresponding to a message type and to transmit the response group containing other received communication responses matching the message type to the first application for group processing. In an embodiment, the second application is further configured to send the communication request having the expanded format and received from the first application to the third application; the second application being further configured to convert the communication response having the first response-format and received from the third application into the reformatted communication response having the second response-format and to forward the reformatted communication response having the second response-format to the messaging application. In an embodiment, the messaging application is further configured to determine the message type for the reformatted communication response having the second response-format forwarded by the second application and to parse and load data into an appropriate holding table in the messaging application based on the message type determined for the reformatted communication response having the second response-format. In an embodiment, the messaging application is further configured to group the data parsed and loaded in the response group and to assign a timestamp to the response group corresponding to the message type and to invoke a processing function module in the first application for receiving into a custom table of a plurality of custom tables in the first application the data grouped in the appropriate holding table in the messaging application, the custom table corresponding to the message type determined. Further, the first application is further configured to group data based on processing criteria and to discard data determined to be duplicate data from the data grouped and to process, based on the message type of the data grouped, such that, the processing of the data grouped and discarded is carried out either in real time mode or in batch mode, depending on the message type. In an embodiment, the first application is a fulfillment application, the second application is a routing application and the third application is a scheduling-shipment application. In an embodiment, the message type includes at least one of an initial scheduling message, a rescheduling message or a shipment message.

In yet another aspect of the invention, there is provided a computer program product for optimizing communication and processing functions between disparate applications. The computer program product includes a computer readable medium and first program instructions to create in a contemporary application, a request message having a condensed format for routing from the contemporary application to a legacy application, the request message having the condensed format providing a plurality of unique data elements relevant to processing the request message and having a reduced data size for optimizing communication. Further, the computer program product includes second program instructions to convert using a routing application the request message having the condensed format into a reformatted request message having an expanded format before routing to the legacy application and third program instructions to convert using the routing application a response message having a legacy format received from the legacy application into a reformatted response message having a contemporary format for routing to a messaging application. Furthermore, the computer program product includes fourth program instructions to queue, using the messaging application, the reformatted response message having the contemporary format in a response group corresponding to a message type, the response group containing other received reformatted response messages having the contemporary format that match the message type before transmitting the response group to the contemporary application. In an embodiment, the fourth program instructions include instructions to determine a message type of one or more message types for the reformatted response message having the contemporary format and to parse and load data received in the reformatted response message into an appropriate holding table in the messaging application. Further, in an embodiment, the fourth program instructions include instructions to collect based on a pre-determined collection criterion, each reformatted response message parsed and loaded into the response group corresponding to the message type in the messaging application and to assign a timestamp to the response group corresponding to the message type. In an embodiment, the fourth program instructions include instructions to invoke a processing function module in the contemporary application for receiving the data loaded in the appropriate holding table in the messaging application and to load the data received into a custom table of a plurality of custom tables in the contemporary application for processing, the custom table corresponding to the message type determined. Further, the fourth program instructions include instructions to group data in the contemporary application based on processing criteria and to discard data determined to be duplicate data from the data grouped and to process, based on the message type, the data grouped and discarded, such that, the contemporary application processes the data grouped and discarded either in real time mode or in batch mode, depending on the message type. In an embodiment, the first application is a fulfillment application, the second application is a routing application and the third application is a scheduling-shipment application. In an embodiment, the message type includes at least one of an initial scheduling message, a rescheduling message or a shipment message. Preferably, each of the first, second, third and fourth program instructions are stored on the computer readable medium.

Further yet, in another aspect of the invention, there is provided a process for deploying computing infrastructure including integrating computer-readable code into a computing system, such that, the code in combination with the computing system is capable of performing a process for optimizing communication and processing functions between disparate applications. The process includes sending, from a first application to a second application, a request message of one or more request messages, the request message being formatted in a first request-format to provide a plurality of unique data elements relevant to processing the request message and having a reduced data size for optimizing communication. The process further includes reformatting, by the second application, the request message received having the first request-format into a reformatted request message having a second request-format, the reformatted request message being forwarded to a third application and creating, by the third application, a response message having a first response-format, the response message being sent to the second application. Furthermore, the process includes converting by the second application the response message sent by the third application into a reformatted response message having a second response-format and sending the reformatted response message to a messaging application. In addition, the process includes queuing, by a messaging application, each response message received from the second application into a response message collection corresponding to a message type, before transmitting the response message collection to the first application, such that, processing of the response message collection received by the first application is optimized. In an embodiment, the queuing step further includes determining, by the messaging application, a message type of one or more message types for the reformatted response message received from the second application, parsing data received in the reformatted response message received, loading the data parsed into an appropriate holding table in the messaging application, grouping the reformatted response message in the collection of a plurality of collections of reformatted response messages based on the message type determined for the reformatted response message, calling a function module in the first application to receive the data loaded in the appropriate holding table in the messaging application and to load the data received into a custom table of a plurality of custom tables in the first application, the custom table corresponding to the message type and triggering processing of the data received and loaded into the first application. In an embodiment, the grouping step further includes collecting, by the messaging application, each reformatted response message received into an appropriate collection of the plurality of collections of reformatted response messages based on the message type determined, until a pre-determined collection criterion has been met and assigning a timestamp to each of the plurality of collections of reformatted response messages for group processing by the first application. In an embodiment, the triggering processing step further includes grouping data, in the first application, based on processing criteria, discarding data determined to be duplicate data from the data grouped and processing, based on the message type, the data grouped and discarded, such that, the processing of the data grouped and discarded is carried out either in real time mode or in batch mode, depending on the message type. In an embodiment, the first application is a fulfillment application, the second application is a routing application and the third application is a scheduling-shipment application. In an embodiment, the message type includes at least one of an initial scheduling message, a rescheduling message or a shipment message.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Figure 1:
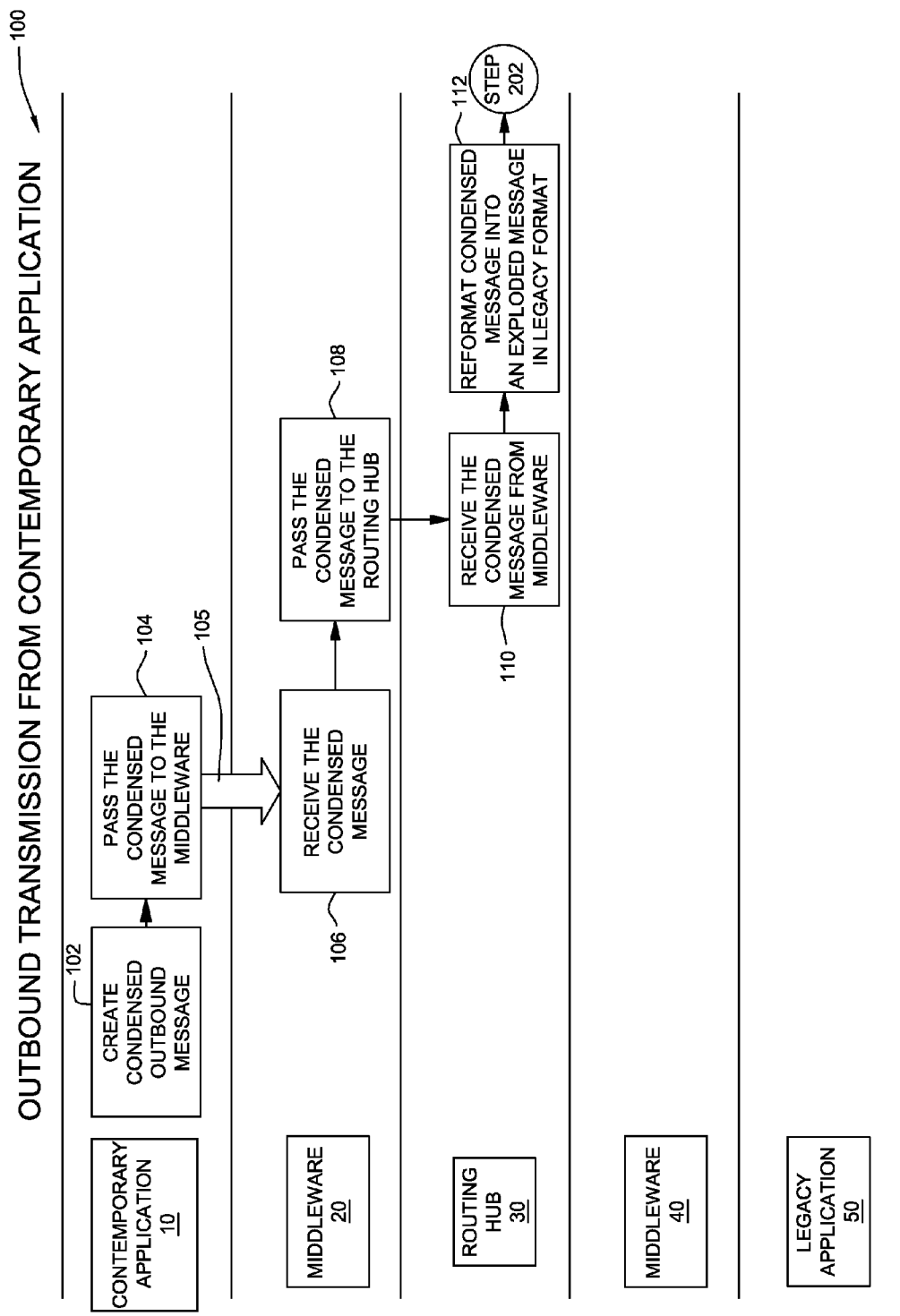
FIGS. 1-9 illustrate a method of optimizing communication and processing functions between disparate applications, in accordance with an embodiment of the invention.

Many of the functional units described in this specification have been labeled as modules, in order to more particularly emphasize their implementation independence. For example, a module may be implemented as a hardware circuit including custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module or component of executable code may, for instance, include one or more physical or logical blocks of computer instructions which may, for instance, be organized as an object, procedure, or function. Nevertheless, the executables of an identified module need not be physically located together, but may include disparate instructions stored in different locations which, when joined logically together, include the module and achieve the stated purpose for the module.

Further, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, over disparate memory devices, and may exist, at least partially, merely as electronic signals on a system or network.

Furthermore, modules may also be implemented as a combination of software and one or more hardware devices. For instance, a module may be embodied in the combination of a software executable code stored on a memory device. In a further example, a module may be the combination of a processor that operates on a set of operational data. Still further, a module may be implemented in the combination of an electronic signal communicated via transmission circuitry.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents. Reference will now be made in detail to the preferred embodiments of the invention.

In a first aspect of the invention, there is provided a method of optimizing communication and processing functions between disparate applications. The method comprises sending, from a first application to a second application, a request message of one or more request messages, the request message being formatted in a first request-format to provide a plurality of unique data elements relevant to processing the request message and having a reduced data size for optimizing communication. Further, the method comprises reformatting, by the second application, the request message received having the first request-format into a reformatted request message having a second request-format, the reformatted request message being forwarded to a third application and creating, by the third application, a response message having a first response-format, the response message being sent to the second application. Furthermore, the method comprises queuing, by a messaging application, each response message received from the second application into a response message collection corresponding to a message type, before sending the response message collection to the first application, such that, processing of the response message collection received by the first application is optimized. The method further comprises converting by the second application the response message received in the first response-format from the third application into a reformatted response message having a second response-format and sending the reformatted response message having the second response-format to the first application. Further, in an embodiment, the queuing step further comprises determining, by the messaging application, a message type of one or more message types for the reformatted response message received from the second application, parsing data received in the reformatted response message received, loading the data parsed into an appropriate holding table in the messaging application and grouping the reformatted response message in the collection of a plurality of collections of reformatted response messages based on the message type determined for the reformatted response message. In an embodiment, the grouping step further comprises collecting, by the messaging application, each reformatted response message received into an appropriate collection of the plurality of collections of reformatted response messages based on the message type determined, until a pre-determined collection criterion has been met. Further, the collecting step comprises assigning a timestamp to each of the plurality of collections of reformatted response messages for group processing by the first application. In an embodiment, the method further comprises calling a function module in the first application to receive the data loaded in the appropriate holding table in the messaging application and to load the data received into a custom table of a plurality of custom tables in the first application, the custom table corresponding to the message type and triggering processing of the data received and loaded into the first application. In an embodiment, the triggering processing step further comprises grouping data, in the first application, based on processing criteria, discarding data determined to be duplicate data from the data grouped and processing, based on the message type, the data grouped and discarded, such that, the processing of the data grouped and discarded is carried out either in real time mode or in batch mode, depending on the message type. In an embodiment, the first application is a fulfillment application, the second application is a routing application and the third application is a scheduling-shipment application. In an embodiment, the message type comprises at least one of an initial scheduling message, a rescheduling message or a shipment message.

Figure 2:
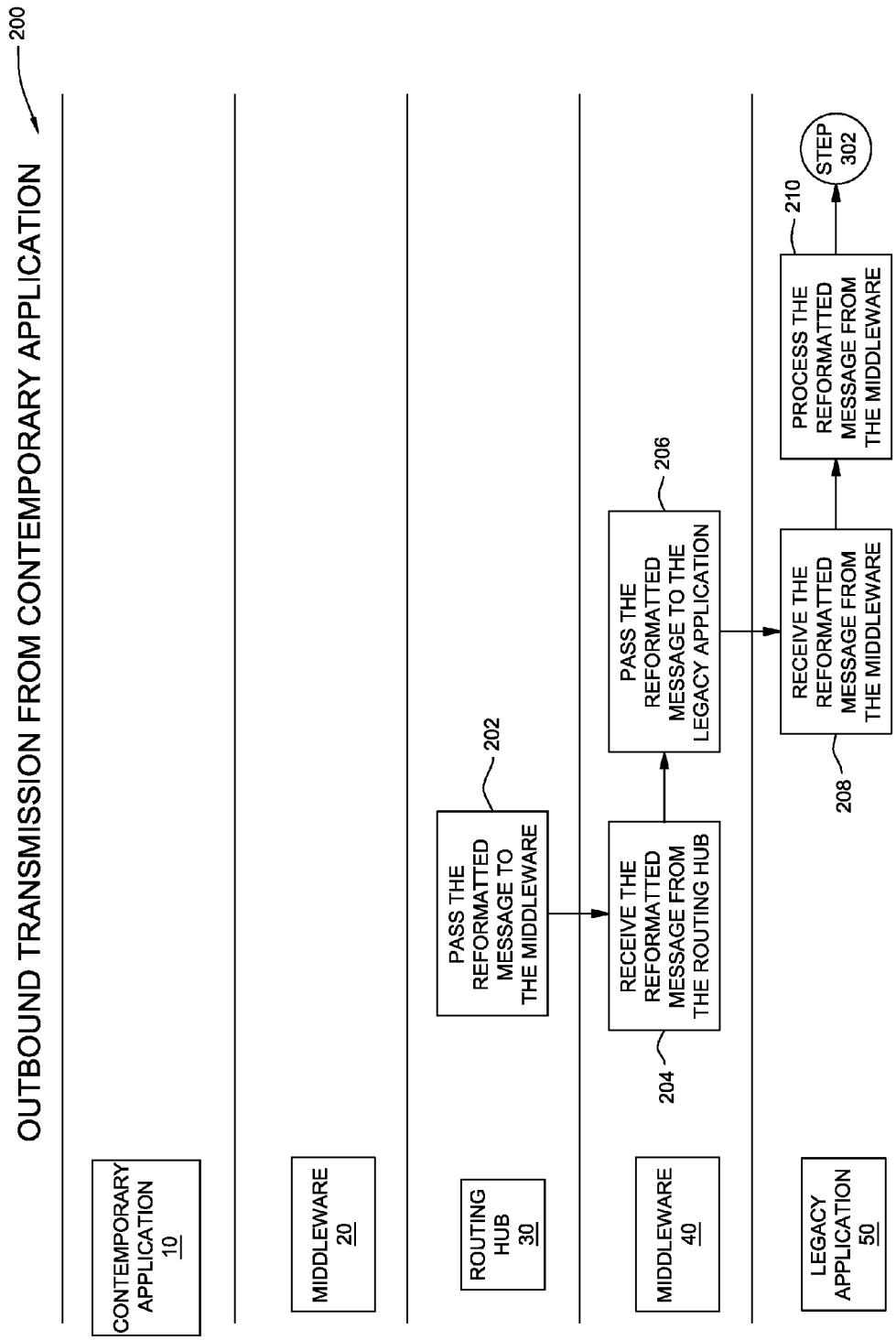

Reference is now made to FIGS. 1 through 9, which together depict a method or process of optimizing communication and processing functions between disparate applications. In particular, FIGS. 1 and 2 depict an outbound process from a contemporary application 10 to a legacy application 50, whereas, FIGS. 3 through 9 depict an inbound process from a legacy application 50 to a contemporary application 10. As used herein, a contemporary application is any application that can accommodate any transformation, for instance, a modification to the application that enhances functionality and/or improves communications with other applications. On the other hand, a legacy application is any application that cannot easily accommodate transformation without posing problems. In an embodiment, the contemporary application 10 comprises an application, for instance, an application that is used for fulfilling a customer order (also referred to herein as "order processing application" or "order fulfillment application" or simply as "first application"), for example, the SAP R/3 software package application that is commercially available from the German software company, SAP AG. Similarly, in an embodiment, the legacy application 50 comprises an application, for instance, any scheduling and shipment application (also referred to herein as "scheduling-shipment application" or simply as "third application") that is commercially available and may interface with a manufacturing application in order to schedule the order and for providing shipment notification of the order to the contemporary application 10. It is understood that although the inventive method or process is described herein in terms of a contemporary order processing application (contemporary application 10) and a legacy scheduling and shipment application (legacy application 50), the method or process can be applied or used to optimize communication and processing functions between any two disparate applications and not just between a contemporary application and a legacy application. Referring to FIG. 1, the method 100 of optimizing communication and processing functions between disparate applications begins in step 102 with the contemporary order fulfillment application 10 creating a request message (or a communication request) in a first request-format, namely, a condensed or compressed format. In an embodiment, the request message created using the SAP R/3 software application 10 is an order scheduling request message created in a condensed or compressed IDoc (Intermediate Document) message format. In particular, the IDoc message comprises of three elements, namely, the header, a data segment and a status record. The header contains administrative data for technical processing, whereas, the status record provides the processing status of the IDoc message at a given point-in-time. Further, the data segment contains the application data which is stored in segments (discussed herein below with respect to FIG. 13), where each segment is a collection of related data that is to be passed to an external system, for instance, the legacy application 50. In particular, in step 102, the SAP R/3 software application or contemporary application 10 creates a condensed IDoc message that comprises an additional or new data segment that reflects or comprises a single iteration of the application data encompassing all of the unique data elements that are required by the legacy application 50 for processing the request. Although, the message format is described herein in terms of an IDoc format that is inherent to the SAP R/3 software application, it is understood that another contemporary or first application used for a different business purpose may create an enhanced request message in a different format so that it may optimize communications with a legacy or third application. In step 104, the contemporary application or SAP R/3 software application 10 passes the condensed message (in the IDoc format) to a message-oriented middleware 20 via link 105. In an embodiment, the middleware 20 comprises a message-oriented middleware used for program-to-program messaging across multiple platforms, for instance, the Websphere MQ software, commercially available from International Business Machines (IBM) Corporation. Again, any other suitable middleware may be used for middleware 20. The middleware 20 receives in step 106, the condensed IDoc request message from the SAP R/3 software application 10. In an embodiment, the IDoc request message created in the SAP R/3 software application is sent via a link 105, for instance, the SAP R/3 link, where R/3 refers to real time having three tiers, namely, presentation, application, and database. Accordingly, the order information is passed in real time to the middleware 20. However, it is understood that any other suitable link 105 may be used depending on the type of contemporary application being used. The middleware 20 passes in step 108 the condensed IDoc request message to a routing hub or transaction hub application 30. In an embodiment, the routing hub application 30 comprises any routing application that is commercially available in the market place. The transaction hub or routing hub application 30 receives the condensed IDoc request message from the middleware 20 in step 110. In an embodiment, the routing hub application 30 reformats in step 112 the condensed IDoc request message received into a second request-format or legacy format, that is, the routing hub application 30 reformats the condensed IDoc request message into an expanded format or an exploded request message (second request-format or legacy format), so that the legacy application 50 can read the data contained in the IDoc request message. The method or process then continues in FIG. 2 in step 202.

As shown in reference numeral 200 of FIG. 2, the routing hub application 30 passes in step 202 the reformatted or expanded request message in the second or legacy format to the middleware 40. In an embodiment, the middleware 40 comprises a message-oriented middleware used for program-to-program messaging across multiple platforms, for instance, the Websphere MQ software, commercially available from International Business Machines (IBM) Corporation. Again, any other suitable middleware may be used for middleware 40. Further, in an embodiment, the middleware 20 may be from a different vendor than the middleware 40. The middleware 40 receives in step 204 the reformatted request message or expanded request message (or second request-format) from the routing hub application 30 and passes the reformatted request message to the legacy application 50 in step 206. The legacy application 50 receives in step 208 the reformatted or expanded request message in the legacy format from the middleware 40 and processes the reformatted or expanded request message in the legacy format received from the middleware 40 in step 210. The method or process then continues in FIG. 3 in step 302.

Figure 3:
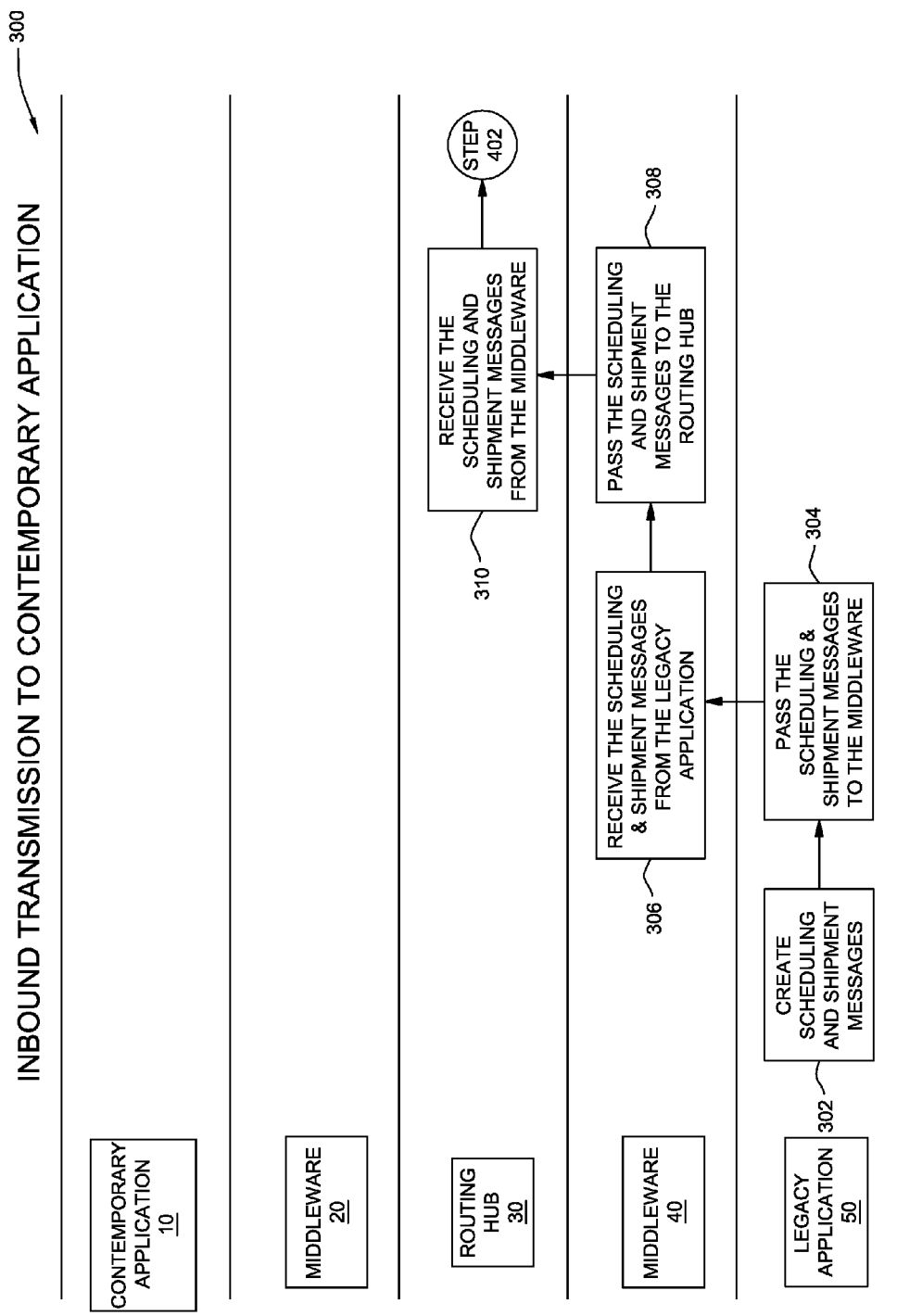

Turning to FIG. 3, reference numeral 300, outlines the inbound communication process between the legacy application 50 and the routing hub application 30. After the legacy application 50 processes the reformatted or expanded request message in the legacy format received from the middleware 40 (in steps 208 and 210 in FIG. 2), the legacy application 50 creates in step 302 a scheduling response message and/or a shipment response message (or referred to as communication responses) corresponding to the request message received. In an embodiment, the scheduling response message and the shipment response message are created in a first response-format or a legacy format. The legacy application 50 passes or forwards or sends in step 304 the scheduling response message and/or the shipment response message created to the middleware 40. The middleware 40 receives in step 306 the scheduling response message and/or the shipment response message from the legacy application 50 and passes in step 308 the scheduling response message and/or the shipment response message received to the routing hub application 30. The routing hub application 30 receives in step 310 the scheduling response message and/or the shipment response message in the legacy format (or first response-format) from the middleware 40. The method or process then continues in FIG. 4 in step 402.

Figure 4:
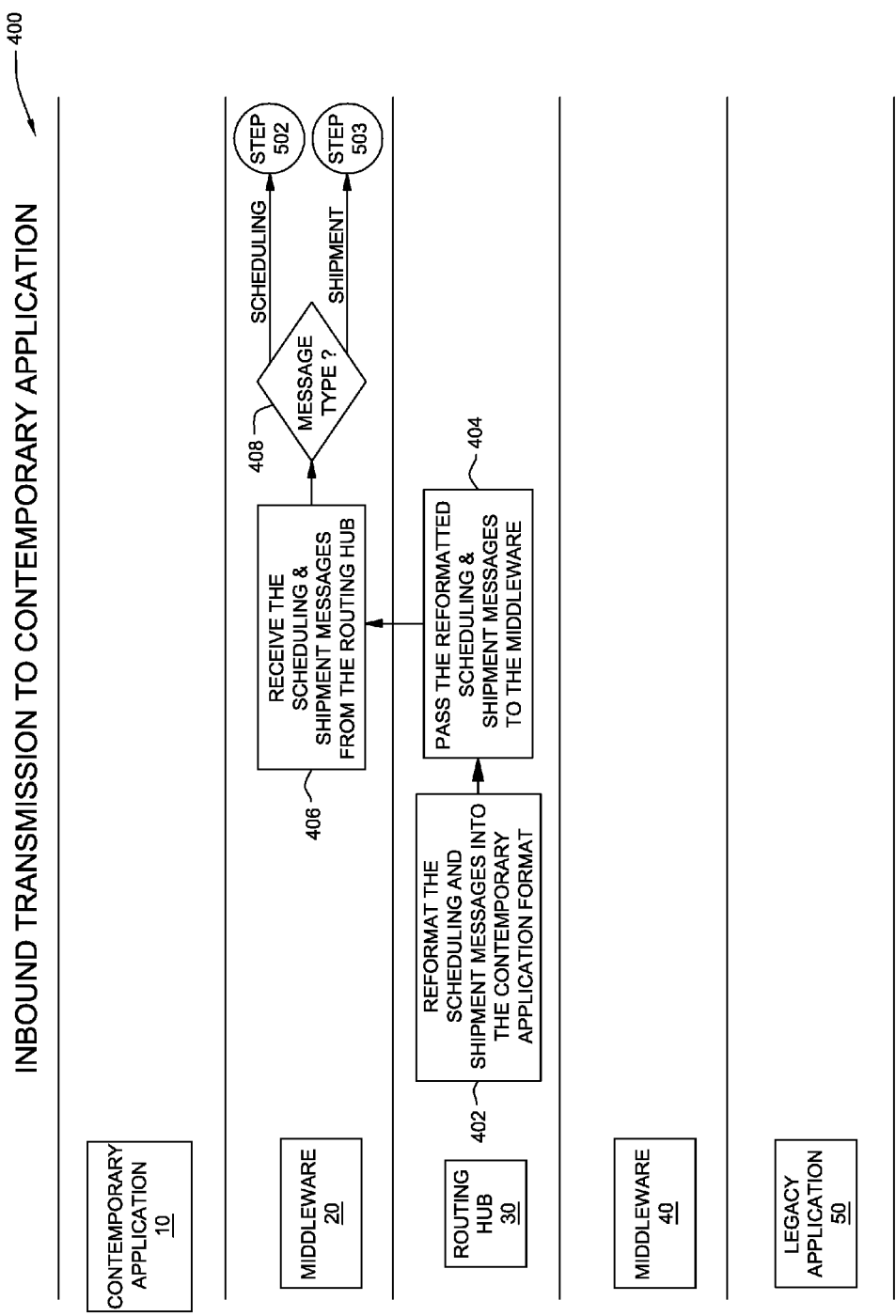

Turning to FIG. 4, reference numeral 400, outlines the inbound communication process between the routing hub application 30 and the middleware 20. As shown in FIG. 4, the routing hub application 30 reformats in step 402 the scheduling response message and the shipment response message received from the legacy application 50 via the middleware 40. In particular, the routing hub application 30 reformats both the scheduling response message and the shipment response message received in the legacy format into a second response-format, namely, a contemporary format that is understood by the contemporary application, such as, a format understood by the SAP R/3 software application 10. Further, the routing hub application 30 passes or routes in step 404 the reformatted scheduling response and the shipment response messages to the middleware 20. The middleware 20 receives in step 406 the reformatted scheduling response and the shipment response messages in the second response-format or contemporary format and determines in step 408 the message type, namely, whether the response message is a scheduling response message or a shipment response message. If the message received is a scheduling response message, then the process continues in step 502 of FIG. 5 and if the message received is a shipment response message, then the process continues in step 503 of FIG. 5.

Figure 5:
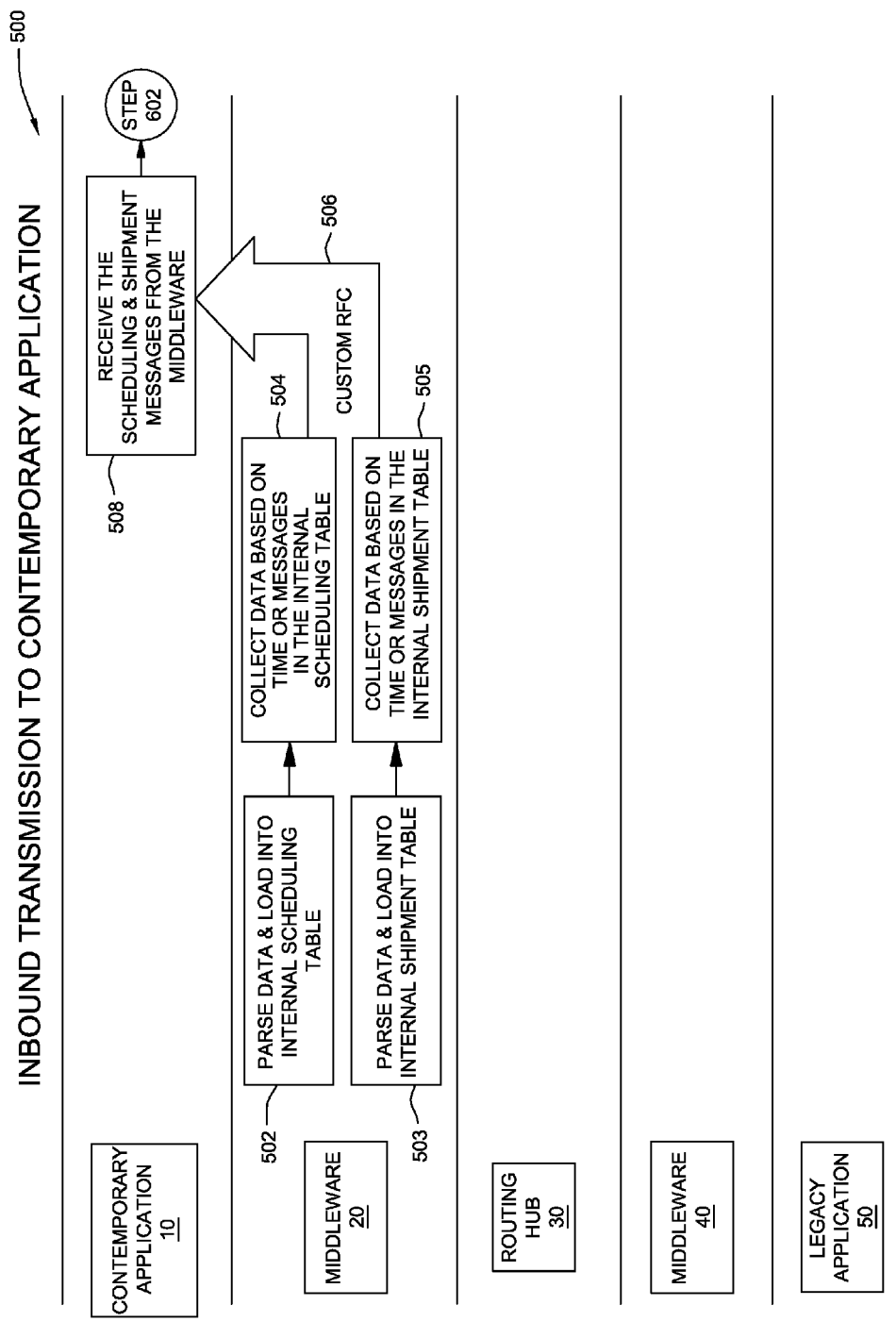

Turning to FIG. 5, reference numeral 500, outlines the inbound communication process between the middleware 20 and the contemporary application 10, for instance, the SAP R/3 software application. As shown in FIG. 5, if the message received is determined by the middleware 20 to be a scheduling response message, then in step 502, the middleware 20 parses in step 502 the data contained in the scheduling response message and loads or stores the parsed data temporarily into an internal scheduling table in the middleware 20. Further, in an embodiment, the middleware 20 continues to collect and group in step 504 data contained in the scheduling response messages received from the routing hub application 30 either based on a pre-determined collection criterion, such as, a pre-determined/preset time interval, for instance, every minute or every 2 minutes, etc. or based on a pre-determined/preset number or threshold of scheduling response messages received and collected, for instance, collecting data until 100 scheduling response messages have been collected or 1000 scheduling response messages have been collected within the internal scheduling tables. As such, the middleware 20 collects data contained in each scheduling response message received either until the pre-determined time interval has elapsed or until the middleware 20 has reached the preset or pre-determined number of scheduling messages. The data collected in step 504 is stored or loaded as a collection or group in the internal scheduling table within the middleware 20 on a temporary basis until the pre-determined time interval or the pre-set number of scheduling messages has been reached, which then triggers the invoking of a RFC (Remote Function Call) for sending the scheduling data to the contemporary application 10, for instance, the SAP R/3 software application. In an embodiment, the middleware 20 stores or loads the data collected for the collection or group of scheduling messages in a flat file format within the scheduling table within the middleware 20. Thus, upon reaching either the pre-determined time interval or the pre-determined number of scheduling response messages in step 504, the middleware 20 invokes a custom remote function call (RFC) in step 506 for calling or invoking an appropriate function module within the contemporary or SAP R/3 software application 10 for processing the collection or group of scheduling response messages. The contemporary or SAP R/3 software application 10 receives in step 508 the scheduling response messages as a collection or group from the middleware 20 and the method or process continues in step 602 of FIG. 6.

Similarly, as shown in FIG. 5, if the message received is determined by the middleware 20 to be a shipment response message, then in step 503, the middleware 20 parses in step 503 the data contained in the shipment response message and loads or stores the parsed data temporarily into an internal shipment table in the middleware 20. Further, in an embodiment, the middleware 20 continues to collect and group in step 505 data contained in the shipment response messages received from the routing hub application 30 either based on a pre-determined collection criterion, such as, a pre-determined/preset time interval, for instance, every minute or every 2 minutes, etc. or based on a pre-determined/preset number or threshold of shipment response messages received and collected, for instance, collecting data until 100 shipment response messages have been collected or 1000 shipment response messages have been collected within the internal shipment tables. As such, the middleware 20 collects data contained in each shipment response message received either until the pre-determined time interval has elapsed or until the middleware 20 has reached the preset or pre-determined number of shipment messages. The data collected in step 505 is stored or loaded as a collection or group in the internal shipment table within the middleware 20 on a temporary basis until the pre-determined time interval or the pre-set number of shipment messages has been reached, which then triggers the invoking of a RFC (Remote Function Call) for sending the shipment data to the contemporary application 10. In an embodiment, the middleware 20 stores or loads the data collected for the collection or group of shipment messages in a flat file format within the shipment table within the middleware 20. Thus, upon reaching either the pre-determined time interval or the pre-determined number of shipment response messages in step 505, the middleware 20 invokes a custom remote function call (RFC) in step 506 for calling or invoking an appropriate function module within the contemporary or SAP R/3 software application 10 for processing the collection or group of shipment response messages. The contemporary or SAP R/3 software application 10 receives in step 508 the shipment response messages as a collection or group from the middleware 20 and the method or process continues in step 602 of FIG. 6.

Figure 6:
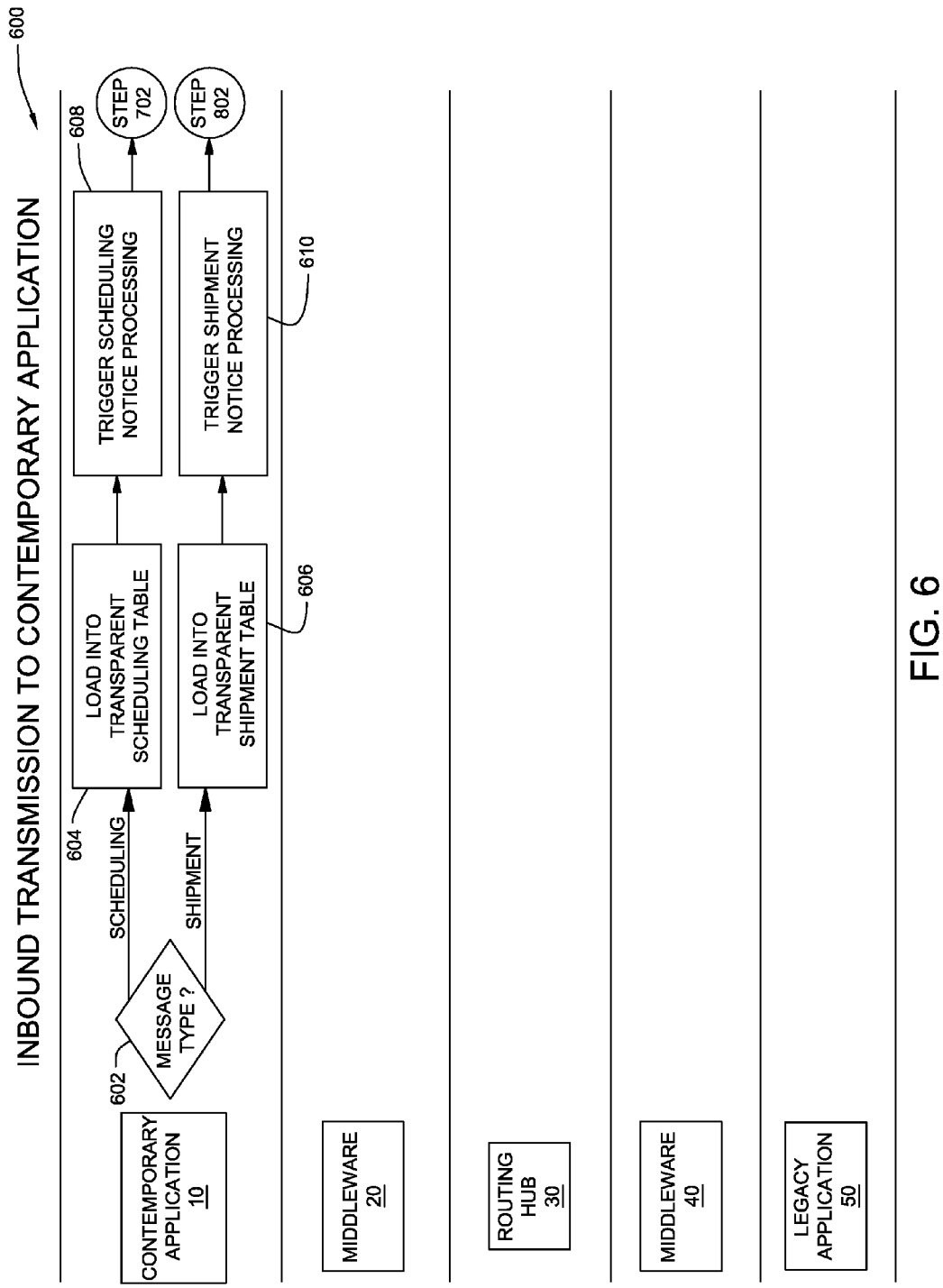

Turning to FIG. 6, reference numeral 600, outlines the inbound processing function carried out by the contemporary application 10, for instance, the SAP R/3 software application used for processing the scheduling and shipment data. As shown in FIG. 6, in step 602, the contemporary application 10 or SAP R/3 software application determines the message type of the collection of messages received in step 508 (shown in FIG. 5) from the middleware 20. In an embodiment, the contemporary application determines the message type in step 602 based upon the message type value contained within a file that is received. If the collection of response messages received in step 508 (in FIG. 5) is determined in step 602 by the contemporary application 10 to be scheduling response messages, regardless of whether a message pertains to a new or an initial scheduling response message or an updated scheduling or rescheduling response message, the contemporary application 10 loads in step 604 the data contained in the collection of scheduling response messages into an internal scheduling or transparent scheduling table within the contemporary application 10 or SAP R/3 software application. Further, the loading of the data into the scheduling table triggers in step 608 the processing of the scheduling messages within the contemporary application 10, which is continued in step 702 of FIG. 7. Similarly, on the other hand, in step 602, if the contemporary application 10 (or SAP R/3 software application) determines that the message type of the collection of messages received in step 508 (shown in FIG. 5) are shipment response messages, then the contemporary application 10 or SAP R/3 software application 10 loads in step 606 the data contained in the collection of shipment response messages into an internal shipment or transparent shipment table within the contemporary application or SAP R/3 software application 10. Further, the loading of the data into the shipment table triggers in step 610 the processing of the shipment messages with the contemporary application 10, which is continued in step 802 of FIG. 8.

Figure 7:
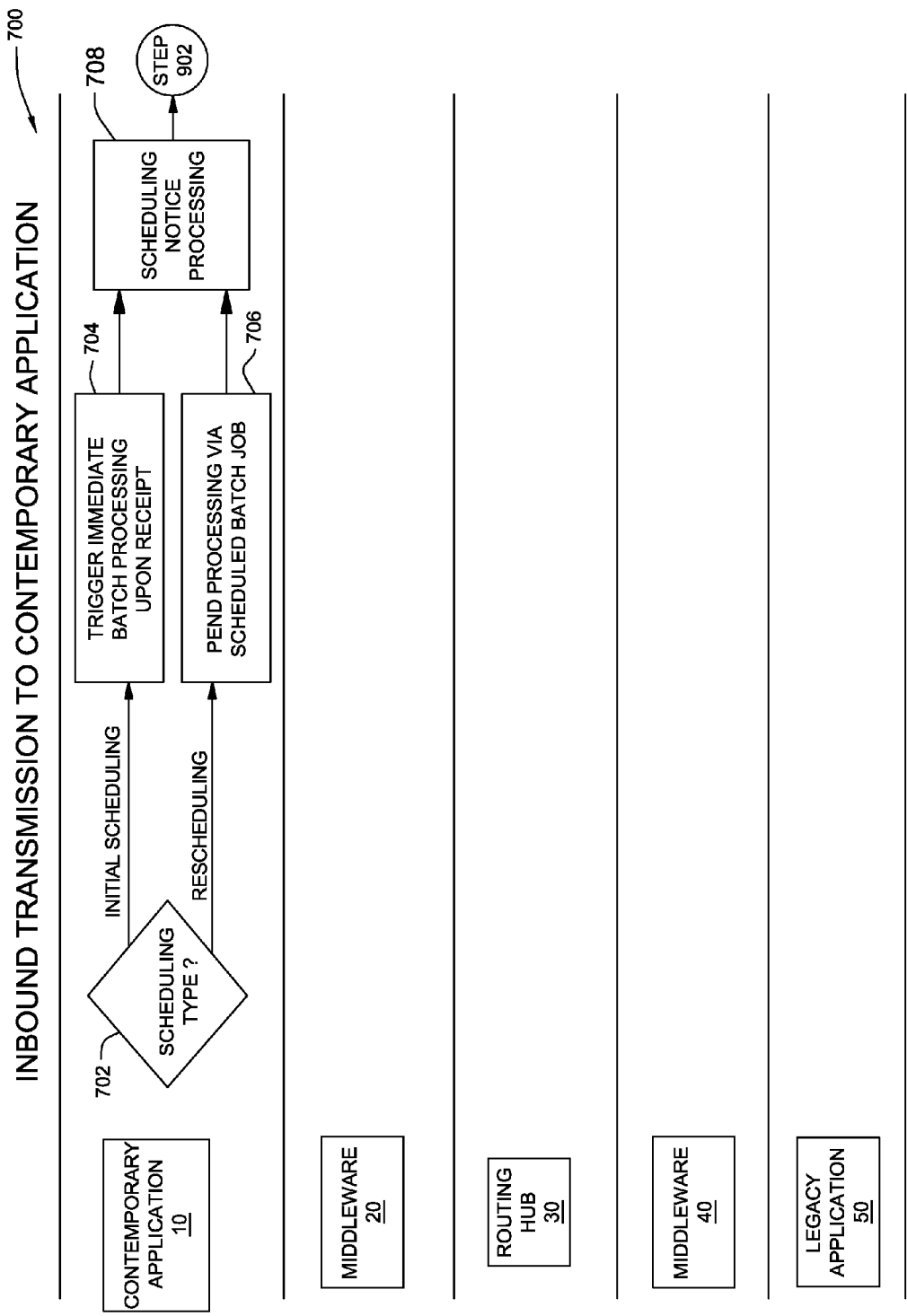

Turning to FIG. 7, reference numeral 700, outlines the inbound processing function carried out by the contemporary application, for instance, the SAP R/3 software application when the message type for the collection of response messages received is determined to be a scheduling response message type. As shown in FIG. 7, in step 702, the contemporary application 10 or SAP R/3 software application further determines if the group or collection of scheduling response messages received pertain to initial or new scheduling response messages, which gets processed in batch mode immediately or whether the group or collection of scheduling response message received pertain to updated or rescheduling response messages, which get processed in extended batch mode, that is, via a scheduled batch job. In an embodiment, the contemporary application determines the message type for the scheduling response based upon the message type value contained within a file that is received. As such, if the contemporary application 10 or SAP R/3 software application determines in step 702 that the group or collection of scheduling response messages pertains to new or initial scheduling response messages, then in step 704, the contemporary application 10 or SAP R/3 software application triggers immediate batch processing upon receipt of the new scheduling response messages. However, if in step 702, the contemporary application 10 or SAP R/3 software application determines that the group or collection of scheduling response messages pertain to updated or rescheduling response messages, then in step 706 the SAP R/3 software application 10 pends processing of the rescheduling response messages via a scheduled batch job. Further, in step 708, the contemporary application 10 or SAP R/3 software application executes scheduling notice processing. In particular, the contemporary application 10 further groups all the scheduling response messages according to pre-determined processing criteria, such as, message type (that is, whether initial scheduling messages or rescheduling messages), date, time, order number, etc. As such, all the initial scheduling response messages are grouped together according to date, time, order number, etc., whereas, all the rescheduling response messages are grouped together according to date, time, order number, etc. Furthermore, the contemporary application 10 uses the processing criteria (date, time, order number, etc.) contained in both the initial scheduling response message group and the rescheduling response message group to discard any duplicate response messages in either of the initial scheduling and rescheduling groups, thus, maximizing efficiency by reducing the amount of data that is processed, as well as reducing the amount of time spent in processing any duplicate initial and rescheduling response messages. After the contemporary application 10 has processed the initial and rescheduling response messages, the method or process continues with step 902 in FIG. 9.

Figure 8:
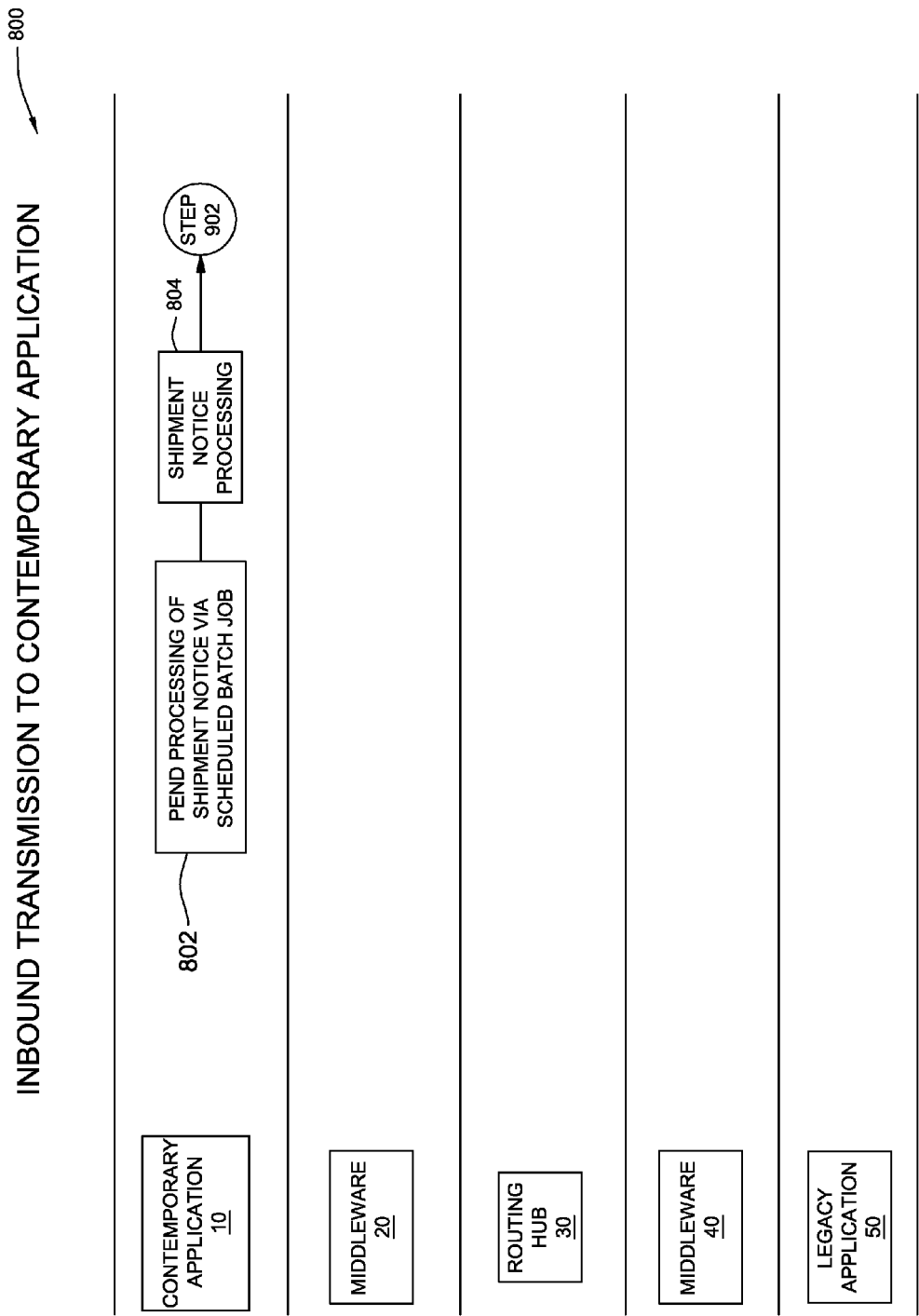

On the other hand, referring to step 610 in FIG. 6, the loading of the shipment data into the shipment table in the contemporary application 10 triggers in step 610 the processing of the shipment messages, which is continued in step 802 of FIG. 8. Turning to FIG. 8, reference numeral 800, outlines the inbound processing function carried out by the contemporary application 10, namely, the SAP R/3 software application, if the message type for the collection of response messages comprises a shipment response message. As shown in FIG. 8, in step 802, the contemporary application 10 or SAP R/3 software application pends processing of the shipment response message via a scheduled batch job. Further, in step 804, the contemporary application 10 or SAP R/3 software application executes shipment notice processing. In particular, the contemporary application 10 further groups all the shipment response messages according to pre-determined processing criteria, such as, date, time, order number, etc. As such, once all the shipment response messages are grouped together according to date, time, order number, etc., the contemporary application 10 uses the processing criteria (date, time, order number, etc.) contained in the shipment response message group to discard any duplicate shipment response messages, thus, maximizing efficiency by reducing the amount of data that is processed, as well as reducing the amount of time spent in processing any duplicate shipment response messages. After the contemporary application 10 has processed the shipment response messages, the method or process continues with step 902 in FIG. 9.

Figure 9:
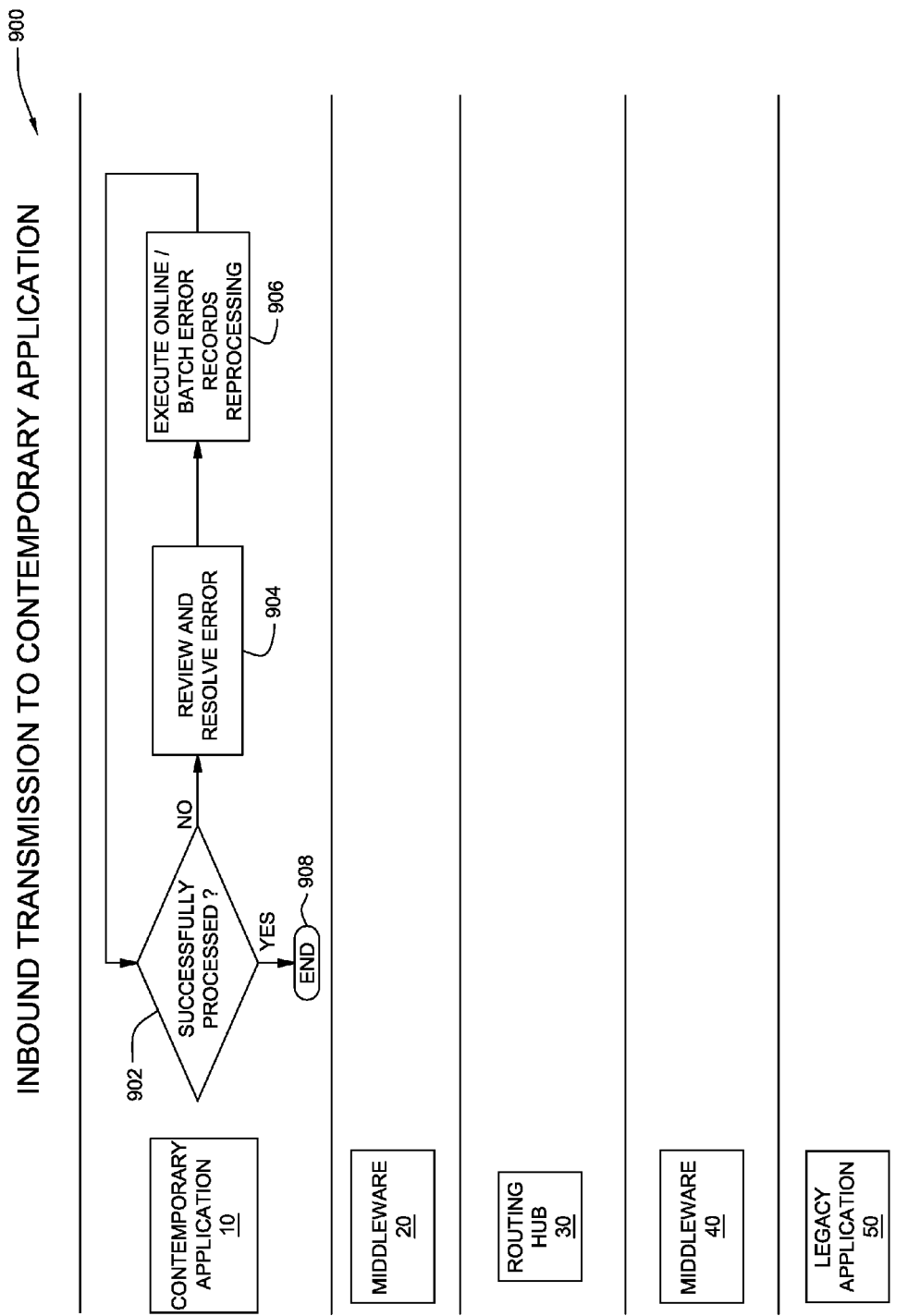

Turning to FIG. 9, reference numeral 900, outlines the error checking process for the inbound processing function carried out by the contemporary application 10, namely, the SAP R/3 software application, after a group of response messages (scheduling and/or shipment response messages) have been processed. As shown in FIG. 9, in step 902, the contemporary application 10 (or SAP R/3 software application) determines whether the group of messages (either the scheduling messages from steps 704 and 706 in FIG. 7 or the shipment messages from step 802 in FIG. 8) were processed successfully. In particular, if a record (message) in a table fails during processing, two fields are updated in the contemporary application to indicate the specific error and the status of the error. If it is determined that the messages were processed successfully, then the process ends at step 908. However, if the contemporary application 10 determines in step 902 that the messages were not successfully processed, then the contemporary application 10 (or SAP R/3 software application) reviews in step 904 the error(s) found and, further, resolves the error(s) in step 904. Furthermore, the contemporary application 10 (SAP R/3 software application) executes in step 906 either an online re-processing of the data records or messages shown to have processing error(s) in step 904, that is, the contemporary application 10 executes re-processing of the messages that were not processed successfully the first time around) or executes a batch error records reprocessing of the records or messages at a scheduled time. Additionally, the contemporary application 10 repeats steps 902 through 906, until all messages with error(s) have been successfully processed, ending the process at step 908.

In another aspect of the invention, there is provided a system for enhancing communication and processing functions between disparate applications. The system comprises a first application configured to send a communication request having a condensed format, the condensed format of the communication request having a data structure that provides a new segment containing a plurality of unique data elements relevant to processing the communication request, the data structure having a reduced data size for enhancing communication. Further, the system comprises a second application configured to convert the communication request received having the condensed format into a reformatted communication request having an expanded format. In addition, the system comprises a third application configured to receive the reformatted communication request having the expanded format from the second application and to generate and send to the second application a communication response having a first response-format, the second application being configured to convert the communication response received having the first response-format into a reformatted communication response having a second response-format before forwarding the reformatted communication response. Moreover, the system comprises a messaging application configured to queue each reformatted communication response having the second response-format forwarded by the second application into a response group corresponding to a message type and to transmit the response group containing other received communication responses matching the message type to the first application for group processing. In an embodiment, the second application is further configured to send the communication request having the expanded format and received from the first application to the third application; the second application being further configured to convert the communication response having the first response-format and received from the third application into the reformatted communication response having the second response-format and to forward the reformatted communication response having the second response-format to the messaging application. In an embodiment, the messaging application is further configured to determine the message type for the reformatted communication response having the second response-format forwarded by the second application and to parse and load data into an appropriate holding table in the messaging application based on the message type determined for the reformatted communication response having the second response-format. In an embodiment, the messaging application is further configured to group the data parsed and loaded in the response group and to assign a timestamp to the response group corresponding to the message type and to invoke a processing function module in the first application for receiving into a custom table of a plurality of custom tables in the first application the data grouped in the appropriate holding table in the messaging application, the custom table corresponding to the message type determined. Further, the first application is further configured to group data based on processing criteria and to discard data determined to be duplicate data from the data grouped and to process, based on the message type of the data grouped, such that, the processing of the data grouped and discarded is carried out either in real time mode or in batch mode, depending on the message type. In an embodiment, the first application is a fulfillment application, the second application is a routing application and the third application is a scheduling-shipment application. In an embodiment, the message type comprises at least one of an initial scheduling message, a rescheduling message or a shipment message.

Figure 10:
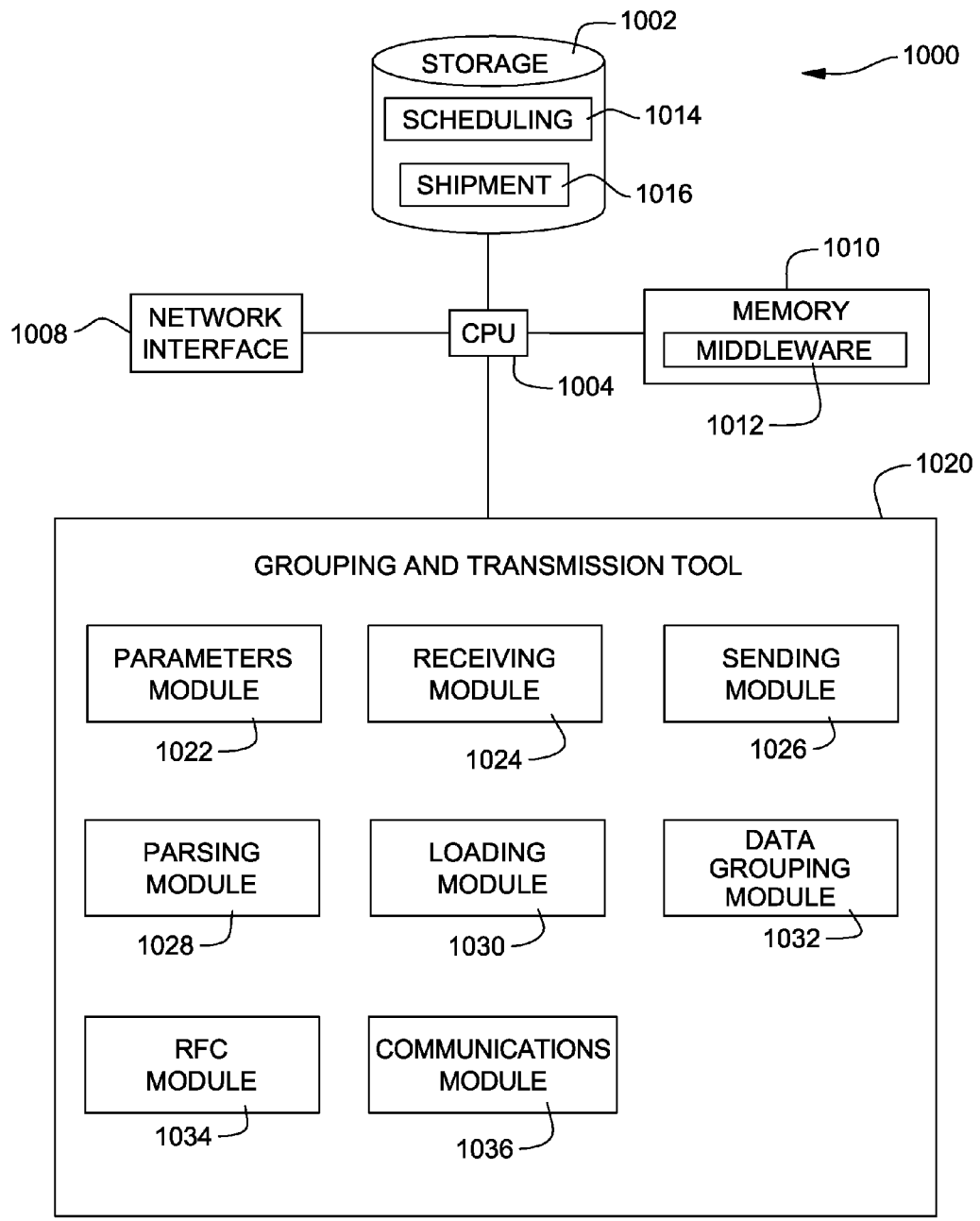
FIG. 10 is a schematic block system diagram illustrating an embodiment of a messaging system having a grouping and transmission tool for optimizing communication and processing functions between disparate applications, in accordance with an embodiment of the invention.
Figure 11:
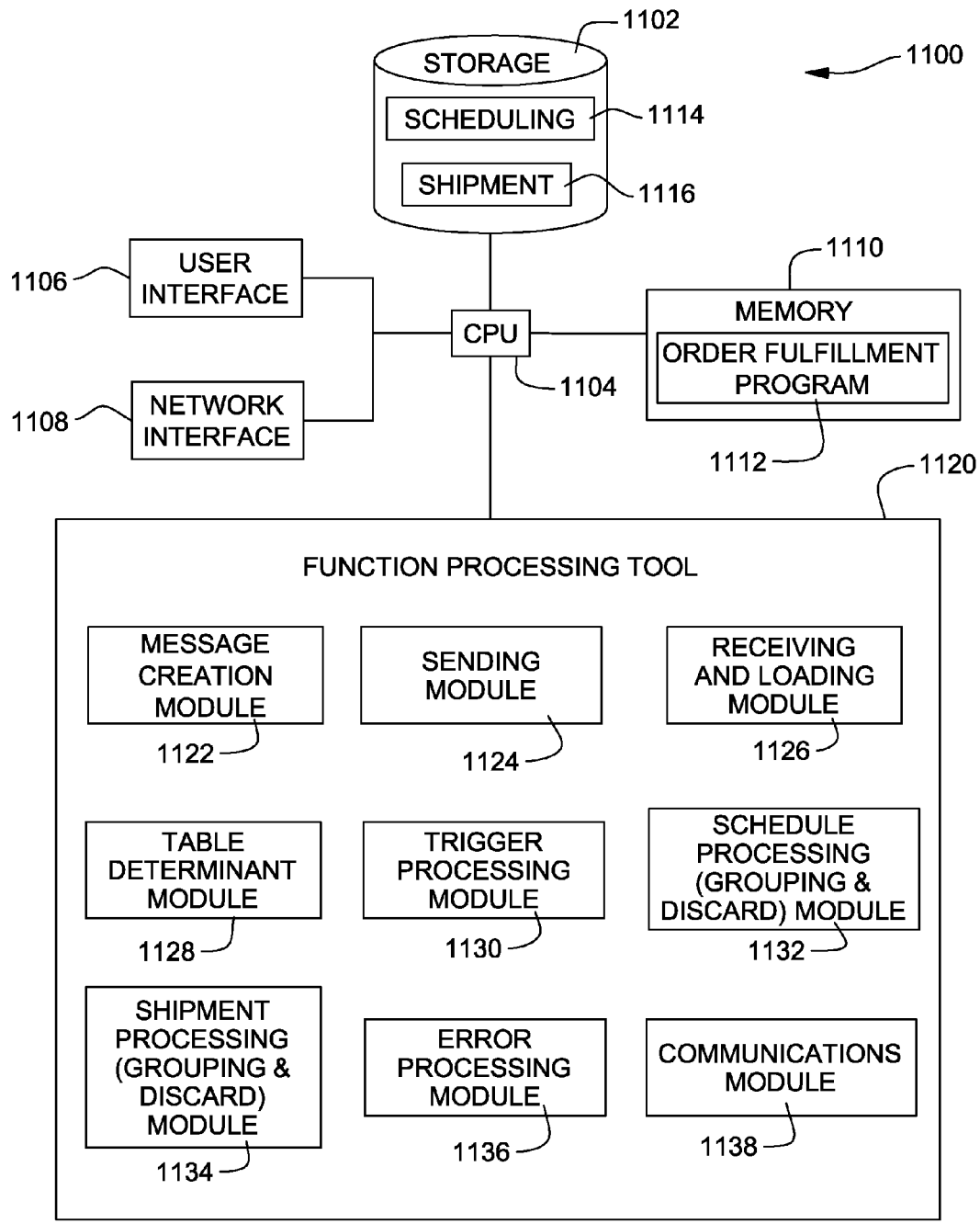
FIG. 11 is a schematic block system diagram illustrating an embodiment of a contemporary system having a function processing tool for optimizing communication and processing functions between disparate applications, in accordance with an embodiment of the invention.

Reference is now made to FIGS. 10 and 11, which illustrate various aspects of a system for optimizing communication and processing functions between disparate applications, in accordance with an embodiment of the invention. Turning to FIG. 10, reference numeral 1000 provides a schematic block diagram of an embodiment of a messaging system or server 1000 having a grouping and transmission tool 1020 for optimizing communication and processing functions between disparate applications. Preferably, the system 1000 is a messaging server that has a message-oriented middleware 1012 installed and running thereon, for instance, the middleware 20, discussed herein above in FIGS. 1-9. In an embodiment, the middleware 1012 comprises Websphere MQ (shown implemented thereon in local memory 1010), which is commercially available from International Business Machines (IBM) Corporation. It is understood that any other commercially available middleware may be used to practice this invention. The server or system 1000 comprises a central processing unit (CPU) 1004, a local storage device 1002, a network interface 1008, and a memory 1010. The CPU 1004 is configured generally to execute operations within the messaging system/server 1000, such as, the middleware 1012, comprising the various modules within the grouping and transmission code or tool 1020. The network interface 1008 is configured, in one embodiment, to facilitate network communications of the system 1000 over a communications channel of a network (not shown in any of the drawings). In one embodiment, as shown in FIG. 10, the grouping and transmission tool or code 1020 within the middleware 1012, which runs on the messaging server or system 1000, comprises a logic unit that contains a plurality of modules configured to functionally execute the necessary steps of transmitting messages as well as grouping response messages according to message type before transmitting the messages to the contemporary application for processing the messages. In particular, the grouping and transmission tool or code 1020 comprises a parameters module 1022, a receiving module 1024, a sending module 1026, a parsing module 1028, a loading module 1030, a data grouping module 1032, a RFC module 1034 and a communications module 1036. The parameters or configuration module 1022 is configured to accept input for various parameters, such as, inputting a pre-set or pre-determined time interval for collecting response messages that are received or for inputting a pre-set number of messages that should be collected before transmitting the messages to the order processing application (for instance, the SAP R/3 software application 10, discussed herein above). The receiving module 1024 of the grouping and transmission tool or code 1020 is configured to receive request messages from an external server or system running an application, such as, a contemporary application that fulfills an order (referred to herein as an order fulfillment application or program), such as, the SAP R/3 software application 10, discussed herein above (as shown in FIG. 1). Further, the receiving module 1024 of the grouping and transmission tool or code 1020 is configured to receive response messages from an external server or system running an application, such as, the routing hub application 30, discussed herein above (as shown in FIG. 4). The sending module 1026 of the grouping and transmission tool or code 1020 is configured to send messages received to an external server or system running an application, such as, sending request messages received from the contemporary application to the routing hub application (as shown in FIG. 1) and, further, sending scheduling response messages and/or shipment response messages received from the routing hub application to the contemporary application (as shown in FIG. 5). Further, the parsing module 1028 is configured to parse data contained in the scheduling response messages and/or the shipment response messages received. Furthermore, the loading module 1030 is configured to load the parsed data into temporary tables within the messaging application or middleware 1012. For instance, each scheduling response message is loaded into a temporary scheduling table 1014, which in an embodiment, is stored within storage 1002. Similarly, each shipment response message is loaded into a temporary shipment table 1016, stored within the storage 1002 of the server 1000. The data grouping module 1032 is configured to group the parsed and loaded data into the appropriate temporary tables based on the parameters (a time interval or number of messages) set forth in the parameters module 1022, so that the data collected is transmitted as a collection to the contemporary or order processing application. In particular, the data grouping module 1032 is configured to group the scheduling response messages received together in a collection and to group the shipment response messages received together in a separate collection, based on either a time interval or number of messages. The RFC (Remote Function Call) module 1034 is configured to invoke or initiate the calling of a customized function module within the order processing application for transmitting the collection of messages to the order processing application for processing by the order processing application. Further, the communications module 1036 is configured to permit communication between the various modules of the grouping and transmission tool or code 1020 and other various components within the middleware 1012, the internal scheduling tables 1014 and the shipment tables 1016 stored within storage 1002, and with other systems, such as, the order processing system 1100 shown in FIG. 11, described herein below.

Turning to FIG. 11, FIG. 11 is a schematic block system diagram illustrating one embodiment of a system or server 1100 having a function processing tool or code 1120 deployed thereon, the function processing tool or code 1120 being configured to process the collection of scheduling and shipment response messages received from a messaging server 1000 (shown in FIG. 10), in accordance with an embodiment of the invention. Preferably, the system 1100 is a server, for instance, an order processing server that has an order processing application or order fulfillment application 1112 installed and running thereon, for instance, the SAP R/3 software application 1112 (shown in local memory 1110), which is commercially available from the company SAP AG. It is understood that any other commercially available order processing or fulfillment application may be used to practice this invention. The order processing server or system 1100 comprises a central processing unit (CPU) 1104, a local storage device 1102, a user interface 1106, a network interface 1108, and a memory 1110. The CPU 1104 is configured generally to execute operations within the system/server 1100, such as, the function processing code or tool 1120 comprising the order fulfillment application or program 1112. The user interface 1106, in one embodiment, is configured to allow a user or programmer to interact with the system 1100, including allowing input of data and commands from a user and communicating output data to the user. The network interface 1108 is configured, in one embodiment, to facilitate network communications of the system 1100 over a communications channel of a network (not shown in any of the drawings).

In one embodiment, as shown in FIG. 11, the function processing tool or code 1120 which runs on the order processing server or system 1100 comprises a logic unit that contains a plurality of modules configured to functionally execute the necessary steps of processing the collection of scheduling and shipment response messages received from the messaging server 1000 in FIG. 10. In particular, the function processing tool or code 1120 comprises a message creation module 1122, a sending module 1124, a receiving and loading module 1126, a table determinant module 1128, a trigger processing module 1130, a schedule processing (grouping and discard) module 1132, a shipment processing (grouping and discard) module 1134, an error processing module 1136 and a communications module 1138. The message creation module 1122 is configured to create a condensed request message that contains only unique data elements, that is, any redundant data is eliminated, as discussed herein above. The sending module 1124 is configured to send a condensed message received from the order fulfillment application to another application on another external system or server, such as, sending a condensed request message created by the function processing tool 1120 in the contemporary application to the routing hub application (shown in FIG. 1), discussed herein above. The receiving and loading module 1126 of the function processing tool or code 1120 of the contemporary application or order fulfillment application 1112 is configured to receive a collection of scheduling response messages and/or shipment response messages from an external system or server, such as, the middleware 20, as shown in FIG. 5. In particular, the receiving and loading module 1126 is configured to receive the scheduling and shipment data collected and loaded temporarily within the scheduling and shipment tables 1014 and 1016 in the messaging server 1000 (in FIG. 10) and to load the received data into appropriate scheduling tables 1114 and/or shipment tables 1116 within a storage 1102 in the order processing server 1100, utilizing the table determinant module 1128. The table determinant module 1128 is configured to determine the type of message being received and to determine based on the message type which table to send the data to, as shown in FIG. 6, so that the data may be loaded into appropriate tables within the order fulfillment application. For instance, if the data received pertains to a collection of scheduling response messages, then the table determinant module 1128 determines an appropriate scheduling table within the contemporary application to which the data is to be sent. Similarly, if the data received pertains to a collection of shipment response messages, then the table determinant module 1128 determines an appropriate shipment table within the contemporary application to which the data is to be sent. Further, the trigger processing module 1130 is configured to trigger processing by the function processing tool 1120, once the received data is loaded into the appropriate tables 1114 and/or 1116 within the order processing server 1100. In particular, the trigger processing module 1130 triggers the execution of either the schedule processing (grouping & discard) module 1132 and/or the shipment processing (grouping & discard) module 1134, described herein below. Accordingly, if the received and loaded data pertains to a collection of scheduling response messages, then the schedule processing module 1132 is executed, which first determines if the scheduling response message data pertains to an initial scheduling response message or a rescheduling response message. As such, the data is separated into initial scheduling response messages and rescheduling response messages. Further, if the response messages data is determined to pertain to initial scheduling response messages, then the scheduling processing (grouping & discard) module 1132 immediately executes batch processing of the initial scheduling response messages. In particular, the schedule processing (grouping & discard) module 1132 groups all the initial scheduling response messages and discards any initial scheduling messages that are determined to be duplicates. Further, if the response message data is determined to pertain to rescheduling response messages, then the schedule processing module 1132 pends processing of the rescheduling response messages via scheduled batch jobs. In particular, the schedule processing (grouping & discard) module 1132 groups all the rescheduling response messages and discards any rescheduling response messages that are determined to be duplicates. On the other hand, if the received and loaded data pertains to a collection of shipment response messages, then the shipment processing (grouping & discard) module 1134 is executed. In an embodiment, the shipment processing (grouping & discard) module 1134 is configured to pend processing of the shipment response messages via scheduled batch jobs. In particular, the shipment processing (grouping & discard) module 1134 groups all the shipment response messages and discards any shipment response messages that are determined to be duplicates. The error processing module 1136 is configured to review records pertaining to processed scheduling and shipment messages in order to check for any errors. In addition, the error processing module 1136 is configured to reprocess the scheduling and shipment response messages that were not successfully processed. Further, the communications module 1138 is configured to permit communication between the various modules of the function processing tool or code 1120 within the order processing application or program 1112, the internal scheduling tables 1114 and the shipment tables 1116 stored within storage 1102, and with other systems, such as, the middleware (1012, shown in FIG. 10).

In yet another embodiment, the invention provides a computer program product for optimizing communication and processing functions between disparate applications. The computer program product includes a computer readable or computer-usable medium, which provides program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. Preferably, the computer storage medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and digital versatile/video disc (DVD). Further, preferably, network medium can comprise of transmission devices on a network, such as, cables, routers, switches and/or network adapter cards.

The computer program product further comprises first program instructions to create in a contemporary application, a request message having a condensed format for routing from the contemporary application to a legacy application, the request message having the condensed format providing a plurality of unique data elements relevant to processing the request message and having a reduced data size for optimizing communication. Further, the computer program product comprises second program instructions to convert using a routing application the request message having the condensed format into a reformatted request message having an expanded format before routing to the legacy application and third program instructions to convert using the routing application a response message having a legacy format received from the legacy application into a reformatted response message having a contemporary format for routing to a messaging application. Furthermore, the computer program product comprises fourth program instructions to queue, using the messaging application, the reformatted response message having the contemporary format in a response group corresponding to a message type, the response group containing other received reformatted response messages having the contemporary format that match the message type before transmitting the response group to the contemporary application. In an embodiment, the fourth program instructions comprise instructions to determine a message type of one or more message types for the reformatted response message having the contemporary format and to parse and load data received in the reformatted response message into an appropriate holding table in the messaging application. Further, in an embodiment, the fourth program instructions comprise instructions to collect based on a pre-determined collection criterion, each reformatted response message parsed and loaded into the response group corresponding to the message type in the messaging application and to assign a timestamp to the response group corresponding to the message type. In an embodiment, the fourth program instructions comprise instructions to invoke a processing function module in the contemporary application for receiving the data loaded in the appropriate holding table in the messaging application and to load the data received into a custom table of a plurality of custom tables in the contemporary application for processing, the custom table corresponding to the message type determined. Further, the fourth program instructions comprise instructions to group data in the contemporary application based on processing criteria and to discard data determined to be duplicate data from the data grouped and to process, based on the message type, the data grouped and discarded, such that, the contemporary application processes the data grouped and discarded either in real time mode or in batch mode, depending on the message type. In an embodiment, the first application is a fulfillment application, the second application is a routing application and the third application is a scheduling-shipment application. In an embodiment, the message type comprises at least one of an initial scheduling message, a rescheduling message or a shipment message. Preferably, each of the first, second, third and fourth program instructions are stored on the computer readable medium.

Figure 12:
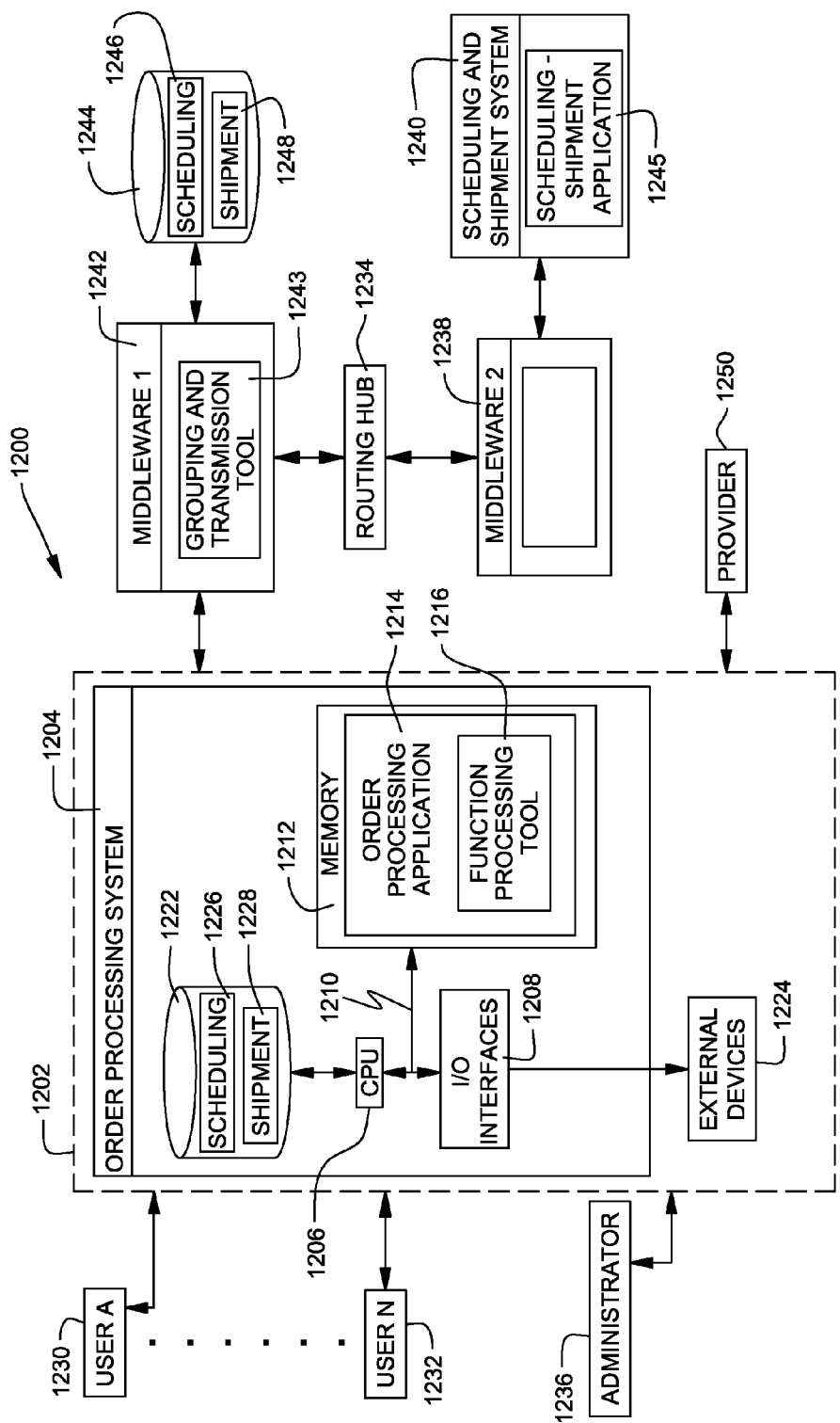
FIG. 12 is a schematic block system diagram illustrating an embodiment of a system having a plurality of computer program products for optimizing communication and processing functions between disparate applications, in accordance with an embodiment of the invention.

Referring now to FIG. 12, there is illustrated a system 1200 for optimizing communication and processing functions between disparate applications, in accordance with an embodiment of the present invention. As depicted, system 1200 comprises a computer infrastructure 1202, which is intended to represent any type of computer architecture that is maintained in a secure environment (i.e., for which access control is enforced). As shown, infrastructure 1202 comprises a computer system 1204 that represents an order processing or order fulfillment server or system 1204 or the like that comprises a function processing tool 1216 configured to optimize communication and processing functions between disparate applications, such as, the order processing application 1214 (or contemporary application) deployed thereon the system 1204 and an external application, such as, the scheduling-shipment application 1245 (or legacy application), deployed on a scheduling and shipment server 1240, where messages are communicated using middleware 1 (reference numeral 1242) and middleware 2 (reference numeral 1238) and where the messages are routed via a routing hub 1234. It should be understood, however, that although not shown, other hardware and software components (e.g., additional computer systems, routers, firewalls, etc.) could be included in infrastructure 1202.

In general, orders are inputted by user A (reference numeral 1230) through user N (reference numeral 1232) into the order processing system 1204, which has deployed thereon the order processing application 1214 that includes the function processing tool 1216. The order processing application 1214 creates, using the function processing tool 1216, one or more condensed request messages in a first request-format (native to the order processing application) pertaining to those orders inputted into system 1204, such that, redundant data or data elements are eliminated in the condensed request messages created in the first request-format. Further, the order processing system 1204 routes the condensed request messages using middleware 1 (reference numeral 1242) to the routing or transaction hub 1234. The routing hub 1234 reformats each of the condensed request messages received in the first request-format into a second request-format and forwards the reformatted request messages via middleware 2 (reference numeral 1238) to the scheduling and shipment server 1240. In particular, the routing hub 1234 explodes or expands the condensed request message, such that, the scheduling-shipment application 1245 can process the request received in the second request-format (exploded or expanded format). The scheduling and shipment server 1240 receives the reformatted (exploded) request messages and processes the reformatted messages by creating appropriate scheduling and/or shipment response messages in a first response-format (or legacy format) that are then sent to the transaction or routing hub application 1234 via the middleware 2 (reference numeral 1238). Again, the routing hub 1234 reformats the scheduling and/or shipment response messages received in the first response-format (legacy format) into a second response-format (contemporary format) that the order processing application 1214 can read. The transaction or routing hub application 1234 then forwards the reformatted (contemporary format) response messages to the middleware 1 (reference numeral 1242). The grouping and transmission tool or code 1243 in the middleware 1 (reference numeral 1242) separates the reformatted response messages into scheduling and shipment response messages and then parses and loads the scheduling data into temporary scheduling tables 1246 (within a storage system or database 1244 in the middleware 1 (reference numeral 1242)) and parses and loads the shipment data into temporary shipment tables 1248 (within a storage system or database 1244 in the middleware 1 (reference numeral 1242)). The grouping and transmission tool 1243 collects the scheduling and shipment response messages according to a pre-determined collection criterion, such as, based on a preset time interval, for example, every minute, or based on a preset number of messages received, for example, 1000 messages. Further, the middleware 1 (reference numeral 1242) initiates a remote function call (RFC) to the order processing application 1214 for transmitting the collection of response messages to the order processing application 1214, once the pre-determined collection criterion has been met, that is, when the pre-determined time interval has expired or when the number of messages have been collected. The function processing tool or code 1216 running on the order processing system 1204, receives and loads the data from the temporary scheduling tables 1246 and the temporary shipment tables 1248 in the middleware 1 (reference numeral 1242) into scheduling tables 1226 and/or shipment tables 1228 (depending on the type of data that is received) in a storage system or database 1222 within the order processing system 1204. Further, the function processing tool 1216 triggers the processing of the data that is loaded into the scheduling tables 1226 and/or shipment tables 1228 within the order processing system 1204, as described herein above.

As shown in FIG. 12, the order processing system 1204 (which includes the order processing application 1214 and the function processing tool 1216) within infrastructure 1202 communicates with the various other systems and/or servers, such as, the middleware 1 (reference numeral 1242), which includes the grouping and transmission tool 1243, the routing hub 1234 and the scheduling and shipment system 1240 (which includes the scheduling-shipment application 1245). To this extent, infrastructure 1202 provides a secure environment. In particular, a user (user A, reference numeral 1230 to user N, reference numeral 1232) accesses the order processing server or system 1204 over a network via interfaces (e.g., web browsers) loaded on a client, for example, a personal computer, a laptop, a handheld device, etc. In the case of the latter, the network can be any type of network such as the Internet, a local area network (LAN), a wide area network (WAN), a virtual private network (VPN), etc. In any event, communication with infrastructure 1202 could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, the parties could utilize an Internet service provider to establish connectivity to infrastructure 1202. It should be understood that under the present invention, infrastructure 1202 could be owned and/or operated by a party such as provider 1250, or by an independent entity. Regardless, use of infrastructure 1202 and the teachings described herein could be offered to the parties on a subscription or fee-basis. In either scenario, an administrator 1236 could support and configure infrastructure 1202, for supporting and/or configuring the infrastructure 1202, such as, upgrading the function processing tool 1216 in the order processing system 1204 or the grouping and transmission tool 1243 in the middleware 1 (reference numeral 1242).

The order processing system or server 1204 is shown to comprise a CPU (hereinafter "processing unit 1206"), a memory 1212, a bus 1210, and input/output (I/O) interfaces 1208. Further, the server 1204 is shown in communication with external I/O devices/resources 1224. In general, processing unit 1206 executes computer program code, such as the order processing application 1214, which comprises the function processing tool or code 1216. While executing computer program code, the processing unit 1206 can read and/or write data, to/from memory 1212, storage system 1222, and/or I/O interfaces 1208. For instance, in one embodiment, the function processing tool 1216 stores the scheduling data received from the middleware 1 (reference numeral 1242) in the scheduling tables 1226 within the order processing system 1204 and stores the shipment data received from the middleware 1 (reference numeral 1242) in shipment tables 1228 within the order processing system 1204. Alternatively, the scheduling data and the shipment data may be stored in a separate storage external to the order processing system 1204. Bus 1210 provides a communication link between each of the components in computer system 1200, such that information can be communicated within the infrastructure 1202. External devices 1224 can include any devices (e.g., keyboard, pointing device, display, etc.) that enable a user to interact with computer system 1200 and/or any devices (e.g., network card, modem, etc.) that enable server 1204 to communicate with one or more other computing devices.

Computer infrastructure 1202 is only illustrative of various types of computer infrastructures for implementing the invention. For example, in an embodiment shown, computer infrastructure 1202 comprises two or more computing devices (e.g., a server cluster) that communicate over a network to perform the various process steps of the invention. Moreover, computer system 1200 is only representative of various possible computer systems that can include numerous combinations of hardware. To this extent, in other embodiments, computer system 1200 can include any specific purpose computing article of manufacture including hardware and/or computer program code for performing specific functions, any computing article of manufacture that includes a combination of specific purpose and general purpose hardware/software, or the like. In each case, the program code and hardware can be created using standard programming and engineering techniques, respectively. Moreover, processing unit 1206 may comprise a single processing unit, or be distributed across one or more processing units in one or more locations, e.g., on a client and server. Similarly, memory 1212 and/or storage system 1222 can include any combination of various types of data storage and/or transmission media that reside at one or more physical locations. Further, I/O interfaces 1208 can include any system for exchanging information with one or more external devices 1224. Still further, it is understood that one or more additional components (e.g., system software, math co-processing unit, etc.) not shown in FIG. 12 can be included in computer system 1200. However, if computer system 1200 includes a handheld device or the like, it is understood that one or more external devices 1224 (e.g., a display) could be contained within computer system 1204, and not externally as shown.

Storage systems 1222 and 1244 can be any type of system (e.g., a database) capable of providing storage for information under the present invention, such as the scheduling data tables and shipment data tables. To this extent, storage systems 1222 and 1244 could include one or more storage devices, such as a magnetic disk drive or an optical disk drive. In another embodiment, storage systems 1222 and/or 1244 include data distributed across, for example, a local area network (LAN), wide area network (WAN) or a storage area network (SAN) (not shown). Although not shown, additional components, such as cache memory, communication systems, system software, etc., may be incorporated into computer system 1200.

Further yet, in another aspect of the invention, there is provided a process for deploying computing infrastructure including integrating computer-readable code into a computing system, such that, the code in combination with the computing system is capable of performing a process for optimizing communication and processing functions between disparate applications. The process comprises sending, from a first application to a second application, a request message of one or more request messages, the request message being formatted in a first request-format to provide a plurality of unique data elements relevant to processing the request message and having a reduced data size for optimizing communication. The process further comprises reformatting, by the second application, the request message received having the first request-format into a reformatted request message having a second request-format, the reformatted request message being forwarded to a third application and creating, by the third application, a response message having a first response-format, the response message being sent to the second application. Furthermore, the process comprises converting by the second application the response message sent by the third application into a reformatted response message having a second response-format and sending the reformatted response message to a messaging application. In addition, the process comprises queuing, by a messaging application, each response message received from the second application into a response message collection corresponding to a message type, before transmitting the response message collection to the first application, such that, processing of the response message collection received by the first application is optimized. In an embodiment, the queuing step further comprises determining, by the messaging application, a message type of one or more message types for the reformatted response message received from the second application, parsing data received in the reformatted response message received, loading the data parsed into an appropriate holding table in the messaging application, grouping the reformatted response message in the collection of a plurality of collections of reformatted response messages based on the message type determined for the reformatted response message, calling a function module in the first application to receive the data loaded in the appropriate holding table in the messaging application and to load the data received into a custom table of a plurality of custom tables in the first application, the custom table corresponding to the message type and triggering processing of the data received and loaded into the first application. In an embodiment, the grouping step further comprises collecting, by the messaging application, each reformatted response message received into an appropriate collection of the plurality of collections of reformatted response messages based on the message type determined, until a pre-determined collection criterion has been met and assigning a timestamp to each of the plurality of collections of reformatted response messages for group processing by the first application. In an embodiment, the triggering processing step further comprises grouping data, in the first application, based on processing criteria, discarding data determined to be duplicate data from the data grouped and processing, based on the message type, the data grouped and discarded, such that, the processing of the data grouped and discarded is carried out either in real time mode or in batch mode, depending on the message type. In an embodiment, the first application is a fulfillment application, the second application is a routing application and the third application is a scheduling-shipment application. In an embodiment, the message type comprises at least one of an initial scheduling message, a rescheduling message or a shipment message.

Accordingly, any of the components of the present invention as shown in FIG. 12 can be deployed, managed, serviced by a service provider 1250 who offers to optimize communication and processing functions between disparate applications. Preferably, the invention provides a business method that performs the process steps of the invention on a subscription, advertising and/or fee basis. In particular, a service provider 1250 (shown in FIG. 12), such as a solution integrator could offer to optimize communication and processing functions between disparate applications. In this case, the service provider can, for instance, create, maintain, and support a computer infrastructure that performs the process steps of the invention for one or more customers. In return, the service provider can receive payment from the customer or customers under a subscription and/or fee agreement and/or the service provider can receive payment from the sale or advertising of content to one or more third parties.

Figure 13:
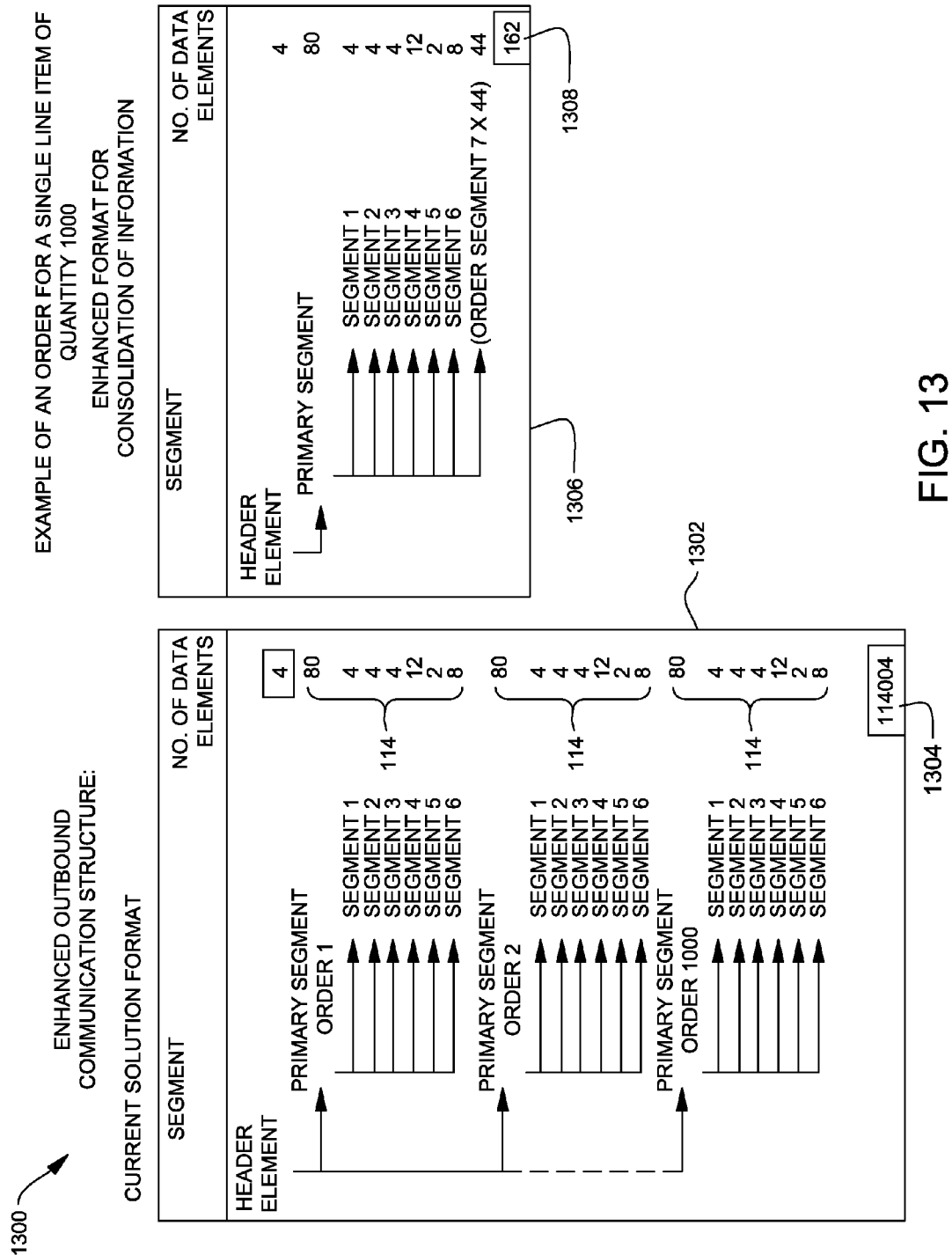
FIG. 13 illustrates an example of an order processed using a contemporary or an order processing application that includes a function processing tool for creating a condensed request message that is sent to an external application, such as, a legacy or scheduling and shipment application, versus an expanded request message in the legacy format that is sent from a contemporary application without the function processing tool that is sent to the legacy application, in accordance with an embodiment of the invention.

Reference is now made to FIG. 13, reference numeral 1300, which illustrates an example of an order processing request for a 1000 items, using a contemporary application or order processing application 1214 (in FIG. 12) that comprises a function processing tool 1216 for creating a condensed request message (discussed in FIG. 1 and shown in table 1306 in FIG. 13) that is sent to an external application, such as, a legacy or scheduling-shipment application 1245 shown deployed on the scheduling and shipment server 1240 (in FIG. 12) versus a typical request message (shown in table 1302) in a legacy format that is sent to a scheduling and shipment application. Turning to table 1306 in FIG. 13, table 1306 depicts the data elements contained in a request message having a condensed format that is sent from the contemporary or order processing application 1214 having deployed thereon the function processing tool 1216 to create the condensed request message and for routing the condensed request message to the legacy or scheduling-shipment application 1245 via the middleware 1 (reference numeral 1242 in FIG. 12), the routing hub application 1234 and the middleware 2 (reference numeral 1238), respectively. Further, the table 1302 in FIG. 13 depicts the data elements contained in a request message having a legacy format or expanded format that would be sent from the contemporary or order processing application 1214 that does not have deployed thereon a function processing tool 1216 to create the condensed request message, such that, the request message having the legacy or expanded format is routed as is to the legacy or scheduling-shipment application 1245. As shown in table 1302, a request message having a legacy format has a header element that contains 4 data elements, and further each order is broken down into seven segments, namely a primary segment and segments 1 through 6. In particular, each primary segment corresponding to a single order has 80 data elements, whereas, segment 1 has 4 data elements, segment 2 has 4 data elements, segment 3 has 4 data elements, segment 4 has 12 data elements, segment 5 has 2 data elements and segment 6 has 8 data elements, such that, the total number of data elements corresponding to the seven segments in an order equals 114 data elements. As such, given that there are 1000 items, the 114 data elements are repeated as shown 1000 times, such that the total number of data elements (reference numeral 1304), including the header element in the request message equals 114,004 (114×1000+4=114,004), box reference numeral 1304. Further, there are only 3 data elements of the 114 data elements that are considered unique data elements for a single order line item. In the example of a 1000 orders, there are 3,000 (3×1000=3,000) unique data elements, thus, 111,004 (114,004−3,000=111,004; shown in box reference numeral 1304) of the total data elements are considered to be common data elements. On the other hand, as shown in table 1308, a condensed request message still contains a header element that has 4 data elements and further contains seven segments (the primary segment, plus, the segments 1 through 6) that add up to 114 data elements in total. However, the condensed request message, instead of repeating the 114 data elements 1000 times, further includes an additional segment, segment 7, which is a single new streamed data element that includes all the unique data elements for the 1000 order items. The single new streamed data element, in an embodiment, is iterated 44 times for an external system, such as, the routing hub application 1234 (in FIG. 12), so that the 44 iterations may be used in an expansion function in the external system to expand or reformat the streamed data elements contained in the condensed request message into a reformatted or expanded request message that contains each of the total data elements (114,004, shown in box reference numeral 1304) for the 1000 line items (as shown in table 1302), that is, the format recognized by the legacy or scheduling-shipment application 1245. As such, the condensed request message contains a total of only 162 (114+4+44=162; shown in box reference numeral 1308) data elements versus a total of 114, 004 data elements that are contained in a legacy or expanded format request message for a single line item of quantity 1000.

The foregoing descriptions of specific embodiments of the present invention have been presented for the purpose of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method of optimizing communication and processing functions between disparate applications, said method comprising the steps of:

sending, from a first application to a second application, a request message of one or more request messages, said request message of said one or more request messages being formatted in a first request-format to provide a plurality of unique data elements relevant to processing said request message and having a reduced data size for optimizing communication;

reformatting, by said second application, said request message received having said first request-format into a reformatted request message having a second request-format, said reformatted request message being forwarded to a third application;

creating, by said third application, a response message having a first response-format, said response message being sent to said second application;

queuing, by a messaging application, each response message received by said second application into a response message collection corresponding to a message type, before sending said response group to said first application, wherein processing of said response message collection received by said first application is optimized;

converting, by said second application, said response message received in said first response-format from said third application into a reformatted response message having a second response-format;

sending said reformatted response message having said second response-format to said first application;

determining, by said messaging application, said message type of one or more message types for said reformatted response message received from said second application;

parsing data received in said reformatted response message received;

loading said data parsed into an appropriate holding table in said messaging application; and grouping said reformatted response message with a plurality of collections of reformatted response messages based on said message type determined for said reformatted response message.

2. The method according to claim 1, wherein said grouping step further comprises the step of:

collecting, by said messaging application, each reformatted response message received into an appropriate collection of said plurality of collections of reformatted response messages based on said message type determined, until a pre-determined collection criterion has been met.

3. The method according to claim 2, wherein said collecting step further comprises the step of:

assigning a timestamp to each of said plurality of collections of reformatted response messages for group processing by said first application.

4. The method according to claim 3, further comprising the steps of:

calling a function module in said first application to receive said data loaded in said appropriate holding table in said messaging application and to load said data received into a custom table of a plurality of custom tables in said first application, said custom table corresponding to said message type; and triggering processing of said data received and loaded into said first application.

5. The method according to claim 4, wherein said triggering processing step further comprises the steps of:

grouping data, in said first application, based on processing criteria;

discarding data determined to be duplicate data from said data grouped; and processing, based on said message type, said data grouped and discarded, wherein said processing of said data grouped and discarded is carried out either in real time mode or in batch mode, depending on said message type.

6. The method according to claim 5, wherein said first application is a fulfillment application; wherein said second application is a routing application; and wherein said third application is a scheduling-shipment application; and wherein said message type comprises at least one of: an initial scheduling message, a rescheduling message and a shipment message.

7. A system for enhancing communication and processing functions between disparate applications, comprising:

a central processing unit, a computer readable memory, and a computer readable storage media:

a first application configured to send a communication request having a condensed format, said condensed format of said communication request having a data structure that provides a new segment containing a plurality of unique data elements relevant to processing said communication request, said data structure having a reduced data size for enhancing communication;

a second application configured to convert said communication request received having said condensed format into a reformatted communication request having an expanded format;

a third application configured to receive said reformatted communication request having said expanded format from said second application and to generate and send to said second application a communication response having a first response-format, said second application being configured to convert said communication response received having said first response-format into a reformatted communication response having a second response-format before forwarding said reformatted communication response; and a messaging application configured to queue each reformatted communication response having said second response-format forwarded by said second application into a response group corresponding to a message type and to transmit said response group containing other received communication responses matching said message type to said first application for group processing, wherein said second application is further configured to send said communication request having said expanded format and received from said first application to said third application; said second application being further configured to convert said communication response having said first response-format and received from said third application into said reformatted communication response having said second response-format and to forward said reformatted communication response having said second response-format to said messaging application, wherein said messaging application is further configured to determine said message type for said reformatted communication response having said second response-format forwarded by said second application and to parse and load data into an appropriate holding table in said messaging application based on said message type determined for said reformatted communication response having said second response-format, and wherein the first application, the second application, the third application, and the messaging application are stored on the computer readable storage media for execution by the central processing unit via the computer readable memory.

8. The system according to claim 7, wherein said messaging application is further configured to group said data parsed and loaded in said response group and to assign a timestamp to said response group corresponding to said message type and to invoke a processing function module in said first application for receiving into a custom table of a plurality of custom tables in said first application said data grouped in said appropriate holding table in said messaging application, said custom table corresponding to said message type determined.

9. The system according to claim 8, wherein said first application is further configured to group data based on processing criteria and to discard data determined to be duplicate data from said data grouped, and to process, based on said message type, said data grouped and discarded, wherein said processing of said data grouped and discarded is carried out either in real time mode or in batch mode, depending on said message type.

10. The system according to claim 9, wherein said first application is a fulfillment application; wherein said second application is a routing application; and wherein said third application is a scheduling-shipment application; and wherein said message type comprises at least one of: an initial scheduling message, a rescheduling message and a shipment message.

11. A computer program product for optimizing communication and processing functions between disparate applications, said computer program product comprising:
a non-transitory computer readable storage medium;
first program instructions to create, in a contemporary application, a request message having a condensed format for routing from said contemporary application to a legacy application, said request message having said condensed format that provides a plurality of unique data elements relevant to processing said request message and having a reduced data size for optimizing communication;
second program instructions to convert, using a routing application, said request message having said condensed format into a reformatted request message having an expanded format before routing to said legacy application;
third program instructions to convert, using said routing application, a response message having a legacy format received from said legacy application into a reformatted response message having a contemporary format for routing to a messaging application;
fourth program instructions to queue, using said messaging application, said reformatted response message having said contemporary format in a response group corresponding to a message type, said response group containing other received reformatted response messages having said contemporary format that match said message type before transmitting said response group to said contemporary application, wherein said fourth program instructions comprise instructions to determine a message type of one or more message types for said reformatted response message having said contemporary format and to parse and load data received in said reformatted response message into an appropriate holding table in said messaging application, wherein said fourth program instructions comprise instructions to collect, based on a pre-determined collection criterion, each reformatted response message parsed and loaded into said response group corresponding to said message type in said messaging application and to assign a timestamp to said response group corresponding to said message type;
and wherein said first, second, third and fourth program instructions are stored on said computer readable medium.

12. The computer program product according to claim 11, wherein said fourth program instructions comprise instructions to invoke a processing function module in said contemporary application for receiving said data loaded in said appropriate holding table in said messaging application and to load said data received into a custom table of a plurality of custom tables in said contemporary application for processing, said custom table corresponding to said message type determined.

13. The computer program product according to claim 12, wherein said fourth program instructions comprise instructions to group data in said contemporary application based on processing criteria and to discard data determined to be duplicate data from said data grouped and to process, based on said message type, said data grouped and discarded, wherein said contemporary application processes said data grouped and discarded either in real time mode or in batch mode, depending on said message type.

14. The computer program product according to claim 13, wherein said first application is a fulfillment application; wherein said second application is a routing application; and wherein said third application is a scheduling-shipment application; and wherein said message type comprises at least one of: an initial scheduling message, a rescheduling message and a shipment message.

15. A process for deploying computing infrastructure comprising integrating computer-readable code into a computing system, wherein said code in combination with said computing system is capable of performing a process for optimizing communication and processing functions between disparate applications, said process comprising:
sending, from a first application to a second application, a request message of one or more request messages, said request message of said one or more request messages being formatted in a first request-format to provide a plurality of unique data elements relevant to processing said request message and having a reduced data size for optimizing communication;
reformatting, by said second application, said request message received having said first request-format into a reformatted request message having a second request-format, said reformatted request message being forwarded to a third application;
creating, by said third application, a response message having a first response-format, said response message being sent to said second application;
converting, by said second application, said response message sent by said third application into a reformatted response message having a second response-format and sending said reformatted response message to a messaging application;
queuing, by said messaging application, each response message received from said second application into a response message collection corresponding to a message type, before transmitting said response group to said first application, wherein processing of said response message collection received by said first application is optimized;
determining, by said messaging application, said message type of one or more message types for said reformatted response message received from said second application;

parsing data received in said reformatted response message received;

loading said data parsed into an appropriate holding table in said messaging application:

grouping said reformatted response message in said collection of a plurality of collections of reformatted response messages based on said message type determined for said reformatted response message:

calling a function module in said first application to receive said data loaded in said appropriate holding table in said messaging application and to load said data received into a custom table of a plurality of custom tables in said first application, said custom table corresponding to said message type; and triggering processing of said data received and loaded into said first application.

16. The process according to claim 15, wherein said grouping step further comprises the steps of:

collecting, by said messaging application, each reformatted response message received into an appropriate collection of said plurality of collections of reformatted response messages based on said message type determined, until a pre-determined collection criterion has been met; and assigning a timestamp to each of said plurality of collections of reformatted response messages for group processing by said first application.

17. The process according to claim 16, wherein said triggering processing step further comprises the steps of:

grouping data, in said first application, based on processing criteria;

discarding data determined to be duplicate data from said data grouped; and processing, based on said message type, said data grouped and discarded, wherein said processing of said data grouped and discarded is carried out either in real time mode or in batch mode, depending on said message type.

18. The process according to claim 17, wherein said first application is a fulfillment application; wherein said second application is a routing application; and wherein said third application is a scheduling-shipment application; and wherein said message type comprises at least one of: an initial scheduling message, a rescheduling message and a shipment message.

* * * * *